United States Patent
Hirakawa et al.

(10) Patent No.: US 8,566,284 B2
(45) Date of Patent: Oct. 22, 2013

(54) DATA REPLICATION AMONG STORAGE SYSTEMS

(75) Inventors: Yusuke Hirakawa, Odawara (JP); Hiroshi Arakawa, Sagamihara (JP); Takahiko Takeda, Minamiashigara (JP); Takao Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/554,163

(22) Filed: Jul. 20, 2012

(65) Prior Publication Data

US 2012/0311252 A1 Dec. 6, 2012

Related U.S. Application Data

(63) Continuation of application No. 11/715,481, filed on Mar. 8, 2007, now Pat. No. 8,239,344, which is a continuation of application No. 10/992,432, filed on Nov. 17, 2004, now Pat. No. 7,725,445, which is a continuation of application No. 10/650,338, filed on Aug. 27, 2003, now Pat. No. 7,152,079.

(30) Foreign Application Priority Data

Jun. 27, 2003 (JP) .................................. 2003-183734

(51) Int. Cl.
G06F 17/30 (2006.01)
(52) U.S. Cl.
USPC ............ 707/640; 707/613; 711/161; 711/162
(58) Field of Classification Search
None
See application file for complete search history.

(56) References Cited

U.S. PATENT DOCUMENTS

| | | | |
|---|---|---|---|
| 4,077,059 A | 2/1978 | Cordi et al. | |
| 4,823,261 A | 4/1989 | Bank et al. | |
| 5,065,311 A | 11/1991 | Masai et al. | |
| 5,086,502 A | 2/1992 | Malcolm | |
| 5,155,845 A | 10/1992 | Beal et al. | |
| 5,170,480 A | 12/1992 | Mohan et al. | |
| 5,263,154 A | 11/1993 | Eastridge et al. | |
| 5,307,481 A | 4/1994 | Shimazaki et al. | |
| 5,369,757 A | 11/1994 | Spiro et al. | |
| 5,379,418 A | 1/1995 | Shimazaki et al. | |

(Continued)

FOREIGN PATENT DOCUMENTS

| | | |
|---|---|---|
| EP | 0902370 | 3/1999 |
| EP | 1217523 | 6/2002 |

(Continued)

OTHER PUBLICATIONS

"Replication Guide and Reference V7: Document No. SC26-9920-00", IBM DB2 Guide, 2000, 455 pages.

(Continued)

*Primary Examiner* — Anteneh Girma
(74) *Attorney, Agent, or Firm* — Mattingly & Malur, PC

(57) ABSTRACT

A first storage system stores information relating to the updating of data stored in that system as a journal. More specifically, the journal is composed of a copy of data that was used for updating and update information such as a write command used during updating. Furthermore, the second storage system acquires the journal via a communication line between the first storage system and the second storage system. The second storage system holds a duplicate of the data held by the first storage system and updates the data corresponding to the data of the first storage system in the data update order of the first storage system by using the journal.

12 Claims, 21 Drawing Sheets

(56) References Cited

U.S. PATENT DOCUMENTS

| | | |
|---|---|---|
| 5,404,508 A | 4/1995 | Konrad et al. |
| 5,459,857 A | 10/1995 | Ludlam et al. |
| 5,479,654 A | 12/1995 | Squibb |
| 5,544,347 A | 8/1996 | Yanai et al. |
| 5,551,003 A | 8/1996 | Mattson et al. |
| 5,555,371 A | 9/1996 | Duyanovich et al. |
| 5,592,618 A | 1/1997 | Micka et al. |
| 5,644,696 A | 7/1997 | Pearson et al. |
| 5,664,186 A | 9/1997 | Bennett et al. |
| 5,680,640 A | 10/1997 | Ofek et al. |
| 5,701,480 A | 12/1997 | Raz |
| 5,720,029 A | 2/1998 | Kern et al. |
| 5,734,818 A | 3/1998 | Kern et al. |
| 5,742,792 A | 4/1998 | Yanai et al. |
| 5,751,997 A | 5/1998 | Kullick et al. |
| 5,799,323 A | 8/1998 | Mosher et al. |
| 5,835,953 A | 11/1998 | Ohran |
| 5,867,668 A | 2/1999 | Spirakis et al. |
| 5,870,758 A | 2/1999 | Bamford et al. |
| 5,901,327 A | 5/1999 | Ofek |
| 5,925,145 A | 7/1999 | Illes et al. |
| 5,933,653 A | 8/1999 | Ofek |
| 5,974,563 A | 10/1999 | Beeler |
| 5,987,575 A | 11/1999 | Yamaguchi |
| 5,995,980 A | 11/1999 | Olson et al. |
| 6,044,444 A | 3/2000 | Ofek |
| 6,052,758 A | 4/2000 | Crockett et al. |
| 6,081,875 A | 6/2000 | Clifton et al. |
| 6,092,066 A | 7/2000 | Ofek |
| 6,098,079 A | 8/2000 | Howard |
| 6,101,497 A | 8/2000 | Ofek |
| 6,128,630 A | 10/2000 | Shackelford |
| 6,148,383 A | 11/2000 | Micka et al. |
| 6,154,852 A | 11/2000 | Amundson et al. |
| 6,157,991 A | 12/2000 | Amon |
| 6,173,377 B1 | 1/2001 | Yanai et al. |
| 6,178,427 B1 | 1/2001 | Parker |
| 6,189,016 B1 | 2/2001 | Cabrera et al. |
| 6,209,002 B1 | 3/2001 | Gagne et al. |
| 6,269,381 B1 | 7/2001 | St. Pierre et al. |
| 6,269,431 B1 | 7/2001 | Dunham |
| 6,282,610 B1 | 8/2001 | Bergsten |
| 6,298,345 B1 | 10/2001 | Armstrong et al. |
| 6,301,677 B1 | 10/2001 | Squibb |
| 6,308,283 B1 | 10/2001 | Galipeau |
| 6,324,654 B1 | 11/2001 | Wahl et al. |
| 6,353,878 B1 | 3/2002 | Dunham |
| 6,360,306 B1 | 3/2002 | Bergsten |
| 6,363,462 B1 | 3/2002 | Bergsten |
| 6,393,538 B2 | 5/2002 | Murayama |
| 6,397,307 B2 | 5/2002 | Ohran |
| 6,397,351 B1 | 5/2002 | Miller et al. |
| 6,408,370 B2 | 6/2002 | Yamamoto et al. |
| 6,442,706 B1 | 8/2002 | Wahl et al. |
| 6,446,176 B1 | 9/2002 | West et al. |
| 6,460,055 B1 | 10/2002 | Midgley et al. |
| 6,463,501 B1 | 10/2002 | Kern et al. |
| 6,467,034 B1 | 10/2002 | Yanaka |
| 6,473,775 B1 | 10/2002 | Kusters et al. |
| 6,477,627 B1 | 11/2002 | Ofek |
| 6,487,645 B1 | 11/2002 | Clark et al. |
| 6,496,908 B1 | 12/2002 | Kamvysselis et al. |
| 6,526,487 B2 | 2/2003 | Ohran et al. |
| 6,539,462 B1 | 3/2003 | Mikkelsen et al. |
| 6,549,992 B1 | 4/2003 | Armangau et al. |
| 6,560,614 B1 | 5/2003 | Barboy et al. |
| 6,587,970 B1 | 7/2003 | Wang et al. |
| 6,594,781 B1 | 7/2003 | Komasaka et al. |
| 6,598,134 B2 | 7/2003 | Ofek et al. |
| 6,604,183 B2 | 8/2003 | Beaven et al. |
| 6,622,152 B1 | 9/2003 | Sinn et al. |
| 6,625,623 B1 | 9/2003 | Midgley et al. |
| 6,658,434 B1 | 12/2003 | Watanabe et al. |
| 6,662,197 B1 | 12/2003 | LeCrone et al. |
| 6,665,815 B1 | 12/2003 | Goldstein et al. |
| 6,691,245 B1 | 2/2004 | DeKoning |
| 6,711,409 B1 | 3/2004 | Zavgren et al. |
| 6,711,572 B2 | 3/2004 | Zakharov et al. |
| 6,728,747 B1 | 4/2004 | Jenkins et al. |
| 6,732,125 B1 | 5/2004 | Autrey et al. |
| 6,742,138 B1 | 5/2004 | Gagne et al. |
| 6,754,792 B2 | 6/2004 | Nakamura et al. |
| 6,799,189 B2 | 9/2004 | Huxoll |
| 6,804,676 B1 | 10/2004 | Bains |
| 6,816,872 B1 | 11/2004 | Squibb |
| 6,829,819 B1 | 12/2004 | Crue et al. |
| 6,839,819 B2 | 1/2005 | Martin |
| 6,859,824 B1 | 2/2005 | Yamamoto et al. |
| 6,877,109 B2 | 4/2005 | Delaney et al. |
| 6,883,122 B2 | 4/2005 | Maple et al. |
| 6,898,688 B2 | 5/2005 | Martin et al. |
| 6,915,315 B2 | 7/2005 | Autrey et al. |
| 6,941,322 B2 | 9/2005 | Bills et al. |
| 6,959,369 B1 | 10/2005 | Ashton et al. |
| 6,968,349 B2 | 11/2005 | Owen et al. |
| 6,978,282 B1 | 12/2005 | Dings et al. |
| 6,981,008 B2 | 12/2005 | Tabuchi et al. |
| 6,981,114 B1 | 12/2005 | Wu et al. |
| 7,111,136 B2 | 9/2006 | Yamagami |
| 2001/0007102 A1 | 7/2001 | Gagne et al. |
| 2001/0010070 A1 | 7/2001 | Crockett et al. |
| 2001/0029570 A1 | 10/2001 | Yamamoto et al. |
| 2001/0049749 A1 | 12/2001 | Katsuragi et al. |
| 2001/0056438 A1 | 12/2001 | Ito |
| 2002/0016827 A1 | 2/2002 | McCabe et al. |
| 2002/0078244 A1 | 6/2002 | Howard |
| 2002/0133511 A1 | 9/2002 | Hostetter et al. |
| 2002/0143888 A1 | 10/2002 | Lisiecki et al. |
| 2003/0014432 A1 | 1/2003 | Teloh et al. |
| 2003/0014433 A1 | 1/2003 | Teloh et al. |
| 2003/0051111 A1 | 3/2003 | Nakano et al. |
| 2003/0074378 A1 | 4/2003 | Midgley et al. |
| 2003/0074523 A1 | 4/2003 | Johnson |
| 2003/0074600 A1 | 4/2003 | Tamatsu et al. |
| 2003/0084075 A1 | 5/2003 | Balogh et al. |
| 2003/0115225 A1 | 6/2003 | Suzuki et al. |
| 2003/0135650 A1 | 7/2003 | Kano et al. |
| 2003/0177306 A1 | 9/2003 | Cochrane et al. |
| 2003/0195903 A1 | 10/2003 | Manley et al. |
| 2003/0204479 A1 | 10/2003 | Bills et al. |
| 2003/0217031 A1 | 11/2003 | Owen et al. |
| 2003/0220935 A1 | 11/2003 | Vivian et al. |
| 2003/0229764 A1 | 12/2003 | Ohno et al. |
| 2004/0010487 A1 | 1/2004 | Prahlad et al. |
| 2004/0030703 A1 | 2/2004 | Bourbonnais et al. |
| 2004/0030837 A1 | 2/2004 | Geiner et al. |
| 2004/0044828 A1 | 3/2004 | Gibble et al. |
| 2004/0059738 A1 | 3/2004 | Tarbell |
| 2004/0059882 A1 | 3/2004 | Kedem et al. |
| 2004/0068636 A1 | 4/2004 | Jacobson et al. |
| 2004/0088508 A1 | 5/2004 | Ballard et al. |
| 2004/0117572 A1 | 6/2004 | Welsh et al. |
| 2004/0128470 A1 | 7/2004 | Hetzler et al. |
| 2004/0133575 A1 | 7/2004 | Farmer et al. |
| 2004/0139128 A1 | 7/2004 | Becker et al. |
| 2004/0153558 A1 | 8/2004 | Gunduc et al. |
| 2004/0163009 A1 | 8/2004 | Goldstein et al. |
| 2004/0172577 A1 | 9/2004 | Tan et al. |
| 2004/0225689 A1 | 11/2004 | Dettinger et al. |
| 2004/0250031 A1 | 12/2004 | Ji et al. |
| 2004/0250033 A1 | 12/2004 | Prahlad et al. |
| 2004/0250182 A1 | 12/2004 | Lyle et al. |
| 2005/0027892 A1 | 2/2005 | McCabe et al. |
| 2005/0038968 A1 | 2/2005 | Iwamura et al. |
| 2005/0039069 A1 | 2/2005 | Prahlad et al. |
| 2005/0050115 A1 | 3/2005 | Kekre |
| 2005/0108302 A1 | 5/2005 | Rand et al. |
| 2005/0193031 A1 | 9/2005 | Midgley et al. |
| 2005/0256811 A1 | 11/2005 | Pagel et al. |

FOREIGN PATENT DOCUMENTS

| | | |
|---|---|---|
| JP | 62-274448 | 11/1987 |
| JP | 02-037418 | 2/1990 |

(56) References Cited

FOREIGN PATENT DOCUMENTS

| | | |
|---|---|---|
| JP | 03-103941 A | 4/1991 |
| JP | 05-002517 A | 1/1993 |
| JP | 07-191811 | 7/1995 |
| JP | 07-244597 | 9/1995 |
| JP | 11-306058 | 11/1999 |
| JP | 11-353215 A | 12/1999 |
| JP | 2000-155708 A | 6/2000 |
| JP | 2000-181634 | 6/2000 |
| JP | 2001-282628 | 10/2001 |
| JP | 2002-189570 | 7/2002 |
| JP | 2002-281065 | 9/2002 |
| JP | 2002-542526 | 10/2002 |
| JP | 2004-511854 | 4/2004 |
| WO | 00/49500 | 8/2000 |
| WO | 02/31696 | 4/2002 |
| WO | WO03/092166 | 11/2003 |

OTHER PUBLICATIONS

"Replication Guide and Reference V8: Document No. SC27-1121-01", IBM DB2 Guide, 2003, 789 pages.

"IBM DB2 RepliData for z/OS, Version 3.1", IBM DB2 Guide, Mar. 2003, 2 pages.

IBM DB2 DataPropagator for z/OS, Version 8.1, IBM DB2 Guide, 2002, 4 pages.

JP 2006-161778, Office Action (English translation), Sep. 10, 2007, 5 pages.

U.S. Appl. No. 09/588,242, filed Jun. 6, 2000, Poston.

"Continuous Data Protection: Business Continuity for the Era of Networked Storage," Aberdeen Group, Inc. Boston MA (Jul. 2003).

"Making ROI a Snap: Leveraging the Power of Snapshot Technology with ComVault TM, QiNetix TM, Quick Recovery," CommVault Systems, Inc. Oceanport, NJ (2002).

"QiNetix Quick Revovery: Snapshot Management and Recovery," CommVault Systems, Inc. Oceanport, NJ (2005).

"QiNetix: Quick Recovery for Microsoft Exchange." CommVault Systems, Inc. Oceanport, NJ (2003).

Bohannon et al. "Distributed Multi-Level Recovery in Main-Memory Databases," Proceedings of the 4th International Conference on Parallel and Distributed Information Systems, pp. 45-55 (1996).

Elnozahy et al "A Survey of Rollback-Recovery Protocols in Message-Passing Systems." ACM Computing Surveys 34:375-408 (Sep. 2002).

Hunnicutt et al, "Mission Data Storage Consolidation (MDSC)," Space Ops 2002 Conference, Paper ID: T2071 (2002).

Lomet et al "Efficient Transparent Application Recovery in Client-Server Information Systems," Proceedings of 1998 ACM SIGMOD International Conference on Management of Data, pp. 460-471 (1998).

Park et al "An Efficient Recovery Scheme for Mobile Computing Environments," Proceedings of the 8th International Conference on Parallel and Distributed Systems (2001).

Thatte "Persistent Memory: A Storage Architecture for Object-Oriented Database Systems," Proceedings of the ACM/IEEE International Workshop on Object-Oriented Database Systems, Pacific Grove, CA, pp. 148-159 (1986).

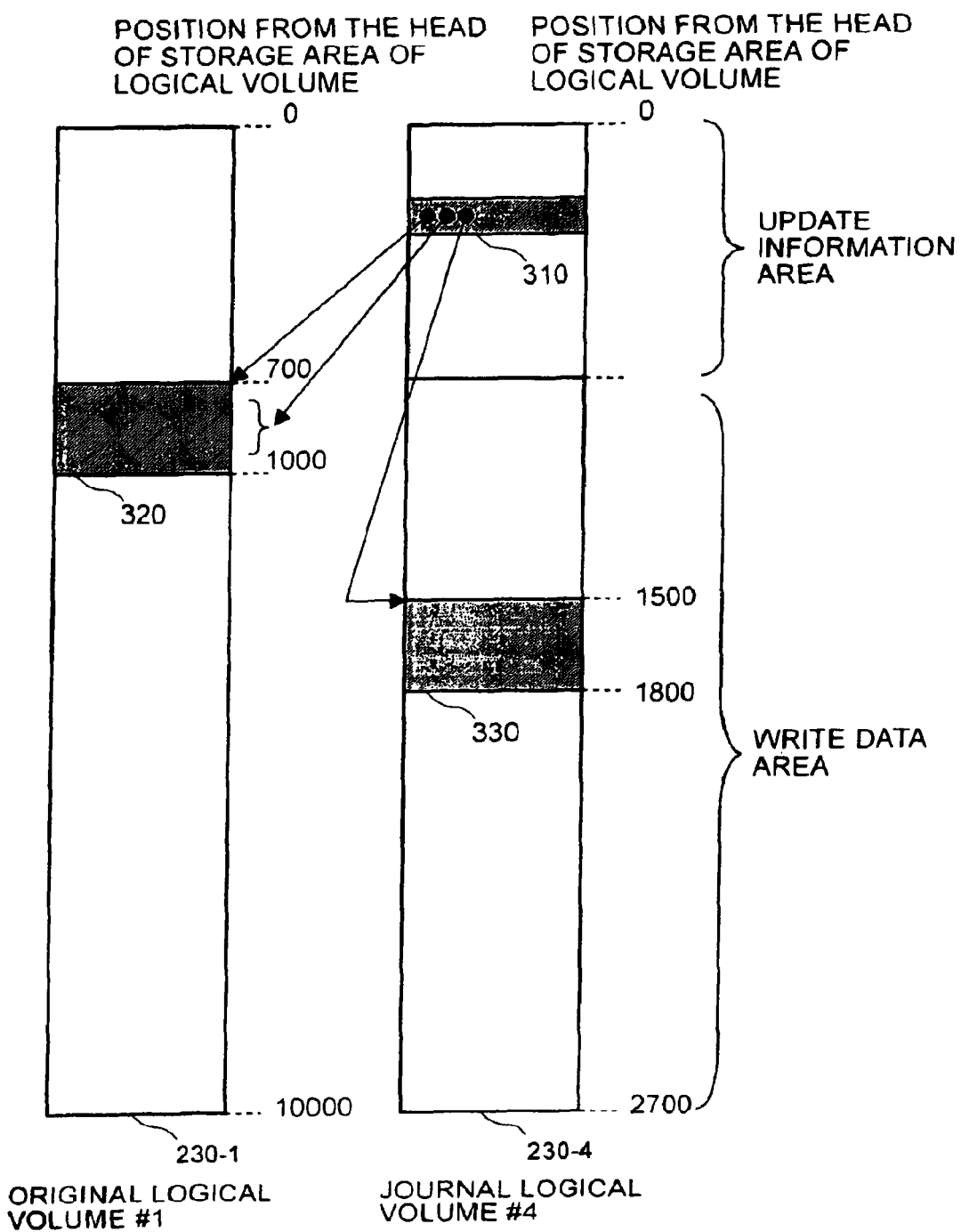

FIG.4

400 VOLUME INFORMATION

| LOGICAL VOLUME NUMBER | VOLUME STATE | FORMAT | CAPACITY | PAIR NUMBER | PHYSICAL ADDRESS STORAGE DEVICE NUMBER | POSITION FROM THE HEAD |
|---|---|---|---|---|---|---|
| 1 | ORIGINAL | OPEN3 | 3 | 1 | 1 | 0 |
| 2 | ORIGINAL | OPEN6 | 6 | 2 | 1 | 3 |
| 3 | BLANK | OPEN6 | 6 | 0 | 1 | 9 |
| 4 | NORMAL | OPEN9 | 9 | 0 | 2 | 0 |
| 5 | NORMAL | OPEN3 | 3 | 0 | 2 | 9 |
| 6 | BLANK | OPEN6 | 6 | 0 | 2 | 12 |

FIG.5

500 PAIR INFORMATION

| PAIR NUMBER | PAIR STATE | ORIGINAL STORAGE SYSTEM NUMBER | ORIGINAL LOGICAL VOLUME NUMBER | SECOND STORAGE SYSTEM NUMBER | SECOND LOGICAL VOLUME NUMBER | GROUP NUMBER | COPY COMPLETE ADDRESS |
|---|---|---|---|---|---|---|---|
| 1 | NORMAL | 1 | 1 | 2 | 1 | 1 | 0 |
| 2 | NORMAL | 1 | 2 | 2 | 3 | 1 | 0 |
| 3 | BLANK | 0 | 0 | 0 | 0 | 0 | 0 |
| 4 | BLANK | 0 | 0 | 0 | 0 | 0 | 0 |
| 5 | BLANK | 0 | 0 | 0 | 0 | 0 | 0 |

FIG.6

600 GROUP INFORMATION

| GROUP NUMBER | GROUP STATE | PAIR SET | JOURNAL LOGICAL VOLUME NUMBER | UPDATE NUMBER |
|---|---|---|---|---|
| 1 | NORMAL | 1,2 | 4 | 1 |
| 2 | BLANK | 0 | 0 | 0 |

FIG.7

| | LOGICAL ADDRESS | |
|---|---|---|
| | LOGICAL VOLUME NUMBER | POSITION FROM THE HEAD OF STORAGE AREA OF LOGICAL VOLUME |
| UPDATE INFORMATION AREA HEAD ADDRESS | 4 | 0 |
| WRITE DATA AREA HEAD ADDRESS | 4 | 700 |
| UPDATE INFORMATION NEWEST ADDRESS | 4 | 500 |
| UPDATE INFORMATION OLDEST ADDRESS | 4 | 200 |
| WRITE DATA NEWEST ADDRESS | 4 | 2200 |
| WRITE DATA OLDEST ADDRESS | 4 | 1300 |
| READ INITIATION ADDRESS | 4 | 400 |
| RETRY INITIATION ADDRESS | 4 | 300 |

701 POINTER INFORMATION

FIG.21

| SETTING ITEM | EXAMPLE OF SET VALUE |
|---|---|
| INSTANT OF TIME AT WHICH WRITE COMMAND WAS RECEIVED | 3/17/1999, 22:20:10 |
| GROUP NUMBER | 1 |
| UPDATE NUMBER | 4 |
| LOGICAL ADDRESS OF WRITE COMMAND | LOGICAL VOLUME NUMBER: 1 POSITION FROM HEAD OF STORAGE AREA OF LOGICAL VOLUME: 700 |
| DATA SIZE OF WRITE DATA | 300 |
| LOGICAL ADDRESS OF JOURNAL LOGICAL VOLUME STORING THE WRITE DATA | LOGICAL VOLUME NUMBER: 4 POSITION FROM HEAD OF STORAGE AREA OF LOGICAL VOLUME: 1500 |

310 UPDATE INFORMATION

FIG.22

| SETTING ITEM | EXAMPLE OF SET VALUE |
|---|---|
| INSTANT OF TIME AT WHICH WRITE COMMAND WAS RECEIVED | 3/17/1999, 22:20:10 |
| GROUP NUMBER | 1 |
| UPDATE NUMBER | 4 |
| LOGICAL ADDRESS OF WRITE COMMAND | LOGICAL VOLUME NUMBER: 1 POSITION FROM HEAD OF STORAGE AREA OF LOGICAL VOLUME: 800 |
| DATA SIZE OF WRITE DATA | 100 |
| LOGICAL ADDRESS OF JOURNAL LOGICAL VOLUME STORING THE WRITE DATA | LOGICAL VOLUME NUMBER: 4 POSITION FROM HEAD OF STORAGE AREA OF LOGICAL VOLUME: 2200 |

DATA REPLICATION AMONG STORAGE SYSTEMS

CROSS-REFERENCES TO RELATED APPLICATIONS

This is a continuation of U.S. Ser. No. 11/715,481, filed Mar. 8, 2007, which is a continuation application of U.S. Ser. No. 10/992,432, filed Nov. 17, 2004 (now U.S. Pat. No. 7,725,445), which is a continuation application of U.S. Ser. No. 10/640,338, filed Aug. 27, 2003 (now U.S. Pat. No. 7,152,079). The present application claims priority to Japanese Patent Application No. 2003 183734, filed on Jun. 27, 2003.

BACKGROUND OF THE INVENTION

The present invention relates to a storage system, and more particularly to data replication among a plurality of storage systems. A technology relating to data replication among storage systems becomes important for providing uninterrupted service to customers even when failure occurs in a first storage system. The following patent specifications have disclosed a technology for replicating the information stored in a first storage system to a second and third storage system.

U.S. Pat. No. 5,170,480 discloses a technology by which a first computer connected to a first storage system transfers data stored in a first storage system to a second computer via a communication link between a first computer and the second computer, and the second computer transfers the data to a second storage system connected to the second computer.

U.S. Pat. No. 6,209,002 discloses a technology by which a first storage system transfers data stored in a first storage system to a second storage system and the second storage system transfers the data to a third storage system. A computer is connected to the first storage system by a communication link, the first storage system is connected to the second storage system by a communication link, and the second storage system is connected to the third storage system by a communication link. The first storage system holds a first logical volume which is the replication object. The second storage system holds a second logical volume which is a duplicate of the first logical volume and a third logical volume which is a duplicate of the second logical volume. The third storage system holds a fourth logical volume which is a duplicate of the third logical volume. As described in the patent specification, the second storage system executes the process for data replication exclusively from the second logical volume to the third logical volume and the process for data replication from the third logical volume to the fourth logical volume.

With the technology disclosed in U.S. Pat. No. 5,170,480, the first and second computers are used all the time. The first computer conducts the usual operations and the load of the data replication process on the first computer cannot be ignored. Another problem is extending the time for data reference and data update necessary for normal operation. Because the data for replication use a communication link between the first computer and the first storage system, this data transfer collides with the data transfer necessary for normal operation.

With the technology disclosed in U.S. Pat. No. 6,209,002, a storage capacity twice as large as the quantity of the replicated data is required for the second and third storage systems. Furthermore, because a large quantity of the data is the object of replication, a long time is spent on the data replication process and the data of the third storage system becomes obsolete. As a result, a problem arises when the operation is restarted using the data of the third storage system: a long time is required to update the data of the third storage system and the time to restart the operation is extended. Furthermore, as described in this specification, after the first storage system has performed process of data updating in the first storage system and process of data advancement between the first storage system and the second storage system, the first storage system sends a data update completion report to the host computer. Therefore, a long time is spent on updating data from the computer, and the time spent on updating data increases with the distance between the first storage system and the second storage system. As a result, another problem associated with the technology disclosed in the '002 patent is that the distance between the storage systems cannot be increased significantly.

BRIEF SUMMARY OF THE INVENTION

It is an object of the present invention to transfer or replicate data between a plurality of storage systems, without affecting the host computer of the storage systems and also without affecting communication between the storage systems and the host computer.

Another object of the present invention is to enable the reduction of data storage areas provided in a plurality of storage systems. Yet another object is to transfer or replicate data among a plurality of storage systems effectively, at high speed and in a seamless manner, so that the operation of the host computer of the plurality of storage systems is not affected.

BRIEF DESCRIPTION OF THE DRAWINGS

FIG. 3 illustrates the relationship between the update information and the write data of the first embodiment of the present invention;

FIG. 4 illustrates an example of volume information of the first embodiment of the present invention;

FIG. 5 illustrates an example of pair information of the first embodiment of the present invention;

FIG. 6 illustrates an example of group information of the first embodiment of the present invention;

FIG. 7 illustrates an example of pointer information of the first embodiment of the present invention;

FIG. 21 illustrates an example of update information of the first embodiment of the present invention;

FIG. 22 illustrates an example of update information during the journal creation process of the second embodiment of the present invention.

DETAILED DESCRIPTION OF THE INVENTION

The embodiments of the data processing system in accordance with the present invention are described below in greater detail with reference to the appended drawings.

Figure 1:
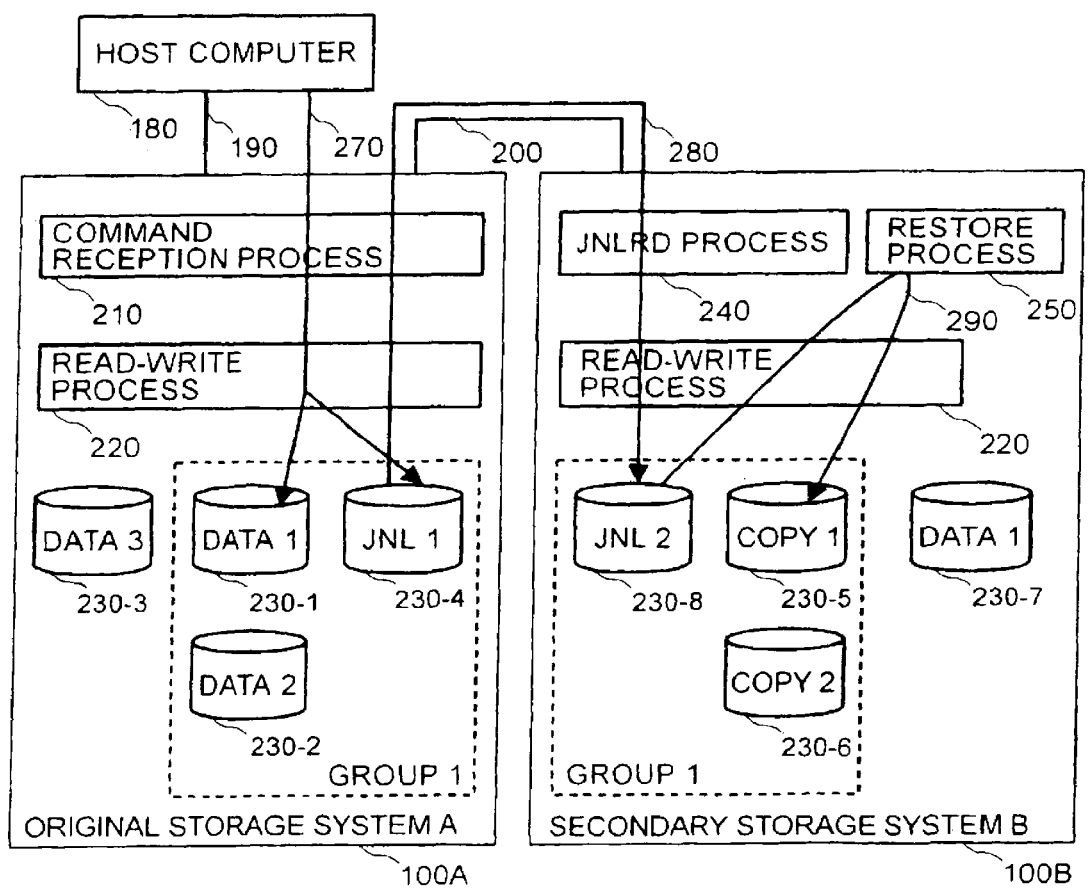
FIG. 1 is a block diagram illustrating a logical configuration of the first embodiment of the present invention.

FIG. 1 is a block diagram illustrating a logical configuration of the first embodiment of the present invention.

In the configuration of the first embodiment of the present invention, a host computer 180 and a first storage system 100A are connected by a connection path 190, and the storage system 100A is connected to a second storage system 100B holding a duplicate of the data retained in the storage system 100A with a connection path 200. In the explanation below, in order to distinguish between the first storage system 100 holding the data which is the object of replication and the second storage system 100 holding the replicated data, we call the storage system 100 holding the data, which is the object of replication, the original storage system 100A, and the storage system 100 holding the replicated data the secondary storage system 100B. The storage area of the storage system is managed by partitioning and we call the partitioned storage areas logical volumes 230. As shown in FIG. 1, the logical volumes include original logical volume 1 230-1 containing DATA1, original logical volume 2 230-2 containing DATA2, journal logical volume 4 230-4 containing JNL1, and logical volume 3 230-3 containing DATA3 in the original storage system A 100A; and secondary logical volume 1 230-5 containing COPY1, secondary logical volume 2 230-6 containing COPY2, secondary journal volume 230-8 containing JNL2, and secondary logical volume 3 230-7 containing DATA1 in the secondary storage system B 100B.

The capacity of each logical volume 230 and the physical storage location (physical address) in storage system 100 can be specified using host computer 180 or a maintenance terminal of a computer connected to storage system 100. The physical address of each logical volume 230 is retained in the volume information 400 described below with reference to FIG. 4. The physical address is, for example, a number (storage device number) identifying a storage device 150 (see, FIG. 2) in storage system 100 and a numeric value uniquely indicating a storage area in the storage device, for example, a position from the head of a storage area of the storage device. In the explanation below, the physical address is storage device number and a position from the head of a storage area of the storage device. The logical volume in the explanation below is a storage area of a single storage device, but a single logical volume can be also associated with storage areas of a plurality of storage devices by converting the logical addresses and physical addresses.

Reference and updating of the data retained by storage system 100 can be uniquely specified by a number identifying the logical volume and a numeric value uniquely indicating the storage area, for example, a position from the head of the storage area of the logical volume. A set of numbers comprising a logical volume number and a position from the head of the storage area of the logical volume (position in a logical address) are called a logical address.

In the explanation below, in order to distinguish between the data which is the object of replication and the replicated data, a logical volume 230, which is the object of replication, is called an original logical volume, and a logical volume 230, which is the replicated data, is called a secondary logical volume. The set of logical volumes comprising an original volume and a secondary volume is called a pair. The relationship and status of an original logical volume and a secondary logical volume is retained in the pair information 500 described below with reference to FIG. 5.

A management unit referred to as a group is defined. The management unit is configured to protect the update sequence of data between the logical volumes. For example, assume that host computer 180 will update data 1 of original logical volume 1 230-1, then read the data 1 and update data 2 of original logical volume 2 230-2 using a numeric value of data 1. When replicating data from original logical volume 1 230-1 to secondary logical volume 1 230-5 (COPY1) and replicating data from original logical volume 2 230-2 to secondary logical volume 2 230-6 (COPY2) are carried out independently, the process of replicating data 2 to secondary logical volume 2 230-6 (COPY2) is sometimes conducted prior to the process of replicating data 1 to secondary logical volume 1 230-5 (COPY1). When a process of replicating data 1 of volume 230-1 to secondary logical volume 1 230-5 (COPY1) is stopped, e.g., due to an accident, in the process of replicating data 2 of volume 230-2 to secondary logical volume 2 230-6 (COPY2) and replicating data 1 to secondary logical volume 1 230-5 (COPY1), the consistency of the data of secondary logical volume 1 230-5 (COPY1) and secondary logical volume 2 230-6 (COPY2) is lost. In this case, too, in order to maintain the consistency of data of secondary logical volume 1 230-5 (COPY1) and secondary logical volume 2 230-6 (COPY2), a logical volume 230-4 (JNL1), which is required to protect the update sequence of data, is recorded in the same group and replicated in the secondary logical volume in the order of update numbers by allocating the update numbers of group information 600 (described below with reference to FIG. 6) for each data update. For example, as shown in FIG. 1, original logical volume 1 230-1 (DATA1) and original logical volume 2 230-2 (DATA2) of original storage system 100A constitute group 1. Secondary logical volume 1 230-5 (COPY1), which is the duplicate of original logical volume 1 230-1 (DATA1), and secondary logical volume 2 230-6 (COPY2), which is the duplicate of original logical volume 2 230-2 (DATA2), constitute group 1 in the secondary storage system 100B.

When the data of the original logical volume, which is the object of data replication, is updated, the journal described below is created and retained in the logical volume 4 230-4 (JNL1) in original storage system 100A for updating the data of the secondary logical volume. In the explanation of the present embodiment, a logical volume (referred to here as a journal logical volume 230-4), retaining only a journal (JNL), is allocated to each group. In the configuration shown in FIG. 1, a logical volume 4 230-4 (JNL1) is allocated to group 1 of storage system 100A.

A journal logical volume 230-8 (JNL2) is also allocated to group 1 of secondary storage system 100B. The journal logical volume 230-8 is used to retain a journal (JNL2) transferred from original storage system 100A to secondary storage system 100B. Retaining a journal in a journal logical volume makes it possible not to update data of the secondary logical volume during journal reception, for example, when the load on the secondary storage system 100B is high, and to wait to update the data of the secondary logical volume until the load on the secondary storage system 100B is low. Furthermore, in the case of a plurality of connection lines 200, multiple transfers of the journal from original storage system 100A to secondary storage system 100B can be made and the transfer capacity of the connection lines 200 can be used effectively. It is possible that many journals will remain in secondary storage system 100B due to the update sequence, but writing the journals that cannot be used directly for data update of the secondary logical volume in the journal logical volume makes it possible to free the cache memory. In the configuration shown in FIG. 1, a logical volume 230-8 (JNL2) is allocated to group 1 in the secondary storage system 100B.

A journal is composed of write data and update information. The update information is used to manage the write data and is composed of the time at which a write command was received, a group number, an update number of the group information 600 described below, the logical address of the write command, the data size of the write data, the logical address of the journal logical volume storing the write data, and the like. The update information may hold only one of either the time at which a write command was received or the update number. When the creation time of the write data is present in the write command from host computer 180, the creation time may be used instead of the time at which a write command was received. An example of the journal update information is described below with reference to FIG. 3 and FIG. 21. A write command received at 22 hours, 20 minutes and 10 seconds on Mar. 17, 1999, is stored as update information 310. This write command stores the write data 320 in position 701 from the head of the storage area of logical volume number 1 230-1, the data size being 300. The write data 330 of the journal is stored at position 1500 from the head of the storage area of logical volume number 4 230-4 (journal logical volume JNL1). The logical volume of logical volume number 1 230-1 belongs to group 1. As illustrated in FIG. 21, this journal indicates that is associated with the fourth data update since the data replication initiation of group 1.

The journal logical volume 4 230-4, for example, as shown in FIG. 3, is used by dividing the volume into a storage area containing update information and a storage area containing write data. In the update information area, the information is stored from the head of the update information area in the order of update numbers, and if the end of the update information area is reached, the information is stored from the head of the update information area. In the write data area, the write data is stored from the head of the write data area, and if the end of the write data area is reached, the data is stored from the head of the write data area. The ratio of the update information area and the write data area may be a fixed value or may be set from the maintenance terminal or host computer 180. The aforesaid information is held in the pointer information 701 described below with reference to FIG. 7. The journal logical volume, according to the explanation below, is used by dividing the volume into update information and write data areas, but a system for continuously storing the journal, that is, the update information and write data, from the head of the logical volume may be also used.

The operation for copying the data update of the primary or original logical volume stored in storage system 100A to the secondary logical volume of storage system 100B is outlined below with reference to FIG. 1.

(1) If the original storage system 100A receives a write command from the host computer 180 relating to data in the original logical volume, the data update in the original logical volume 230-1 (DATA1) and journal retention in the journal logical volume 230-4 (JNL1) are controlled by the command reception process 210 and read-write process 220, as illustrated by the arrow 270 in FIG. 1.

(2) The secondary storage system 100B reads the journal from the original or primary storage system 100A by the journal read process 240 and retains the journal in the journal logical volume (JNL2 230-7) by the read-write process 220 in FIG. 1.

(3) If original storage system 100A receives a command for reading the journal from secondary storage system 100B, the journal is read from journal logical volume 230-4 (JNL1) and transmitted to secondary storage system 100B by the command reception process 210 and read-write process 220, as illustrated by the arrow 280 in FIG. 1.

(4) Secondary storage system 100B reads the journal from journal logical volume 230-8 (JNL2) in ascending order of update numbers using pointer information 701 and updates the date of secondary logical volume 1 230-5 (COPY1) by the restore process 250 read-write process 220, as illustrated by arrow 290 in FIG. 1.

Figure 2:
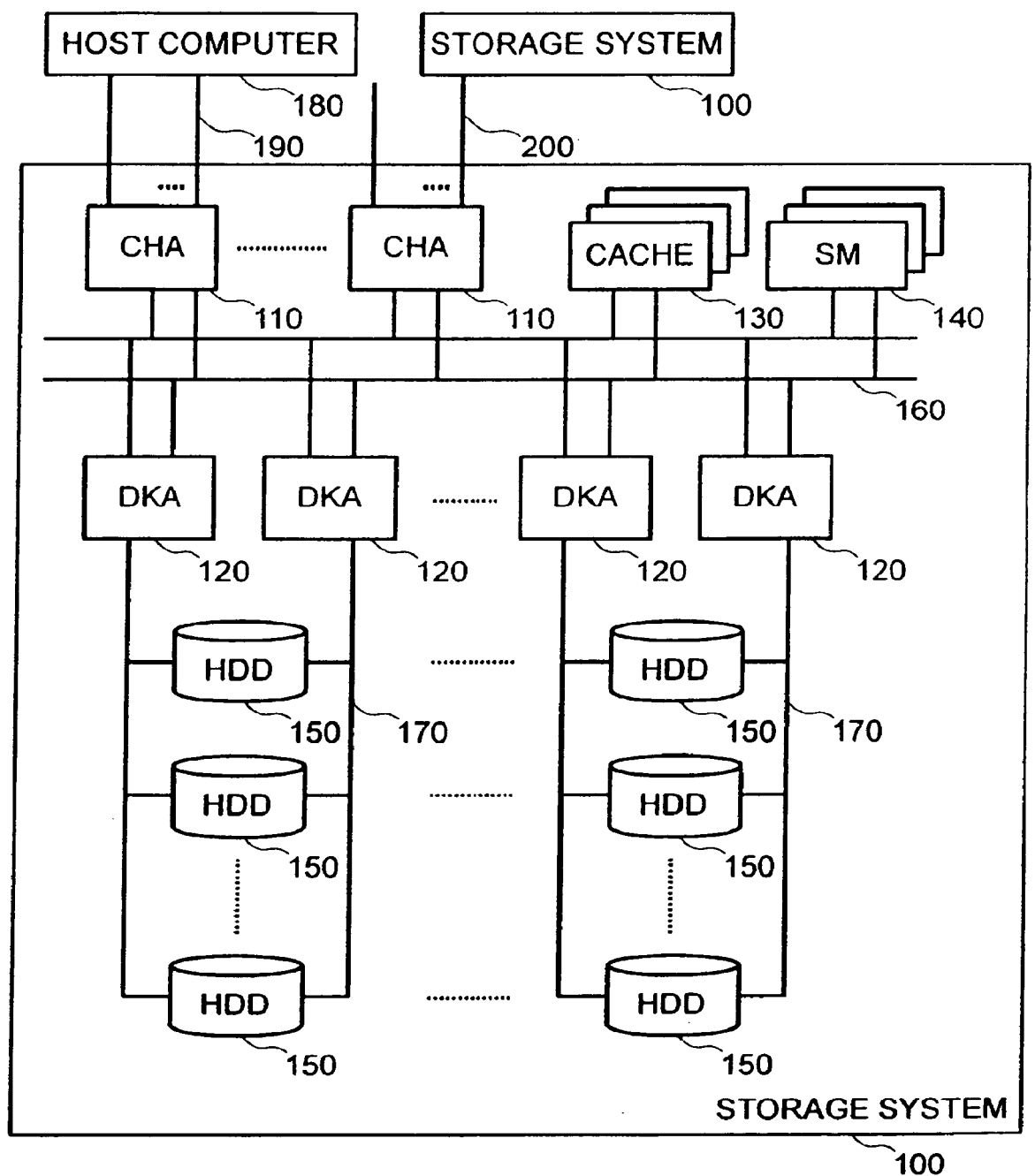
FIG. 2 is a block diagram of the storage system of the first embodiment of the present invention.

The internal structure of storage system 100 is shown in FIG. 2. Storage system 100 comprises one or more host adapters 110, one or more disk adapters 120, one or more cache memory units 130, one or more shared memory units 140, one or more storage devices 150, one or more common paths 160, and one or more connection lines 170. Host adapters 110, disk adapters 120, cache memory units 130, and shared memory units 140 are connected with each other by common paths 160. Common paths 160 may be duplexed to prevent a failure of a common path 160. Disk adapters 120 and storage devices 150 are connected by connection lines 170. Maintenance terminals configured to perform the setting, monitoring, and maintenance of storage system 100 are connected by special lines to all the host adapters 110 and disk adapters 120 (this connection is not shown in the figure).

Host adapters 110 control data transfer between host computer 180 and cache memory 130. Host adapters 110 are connected to the host computer 180 or to the other storage systems 100 by the respective connection lines 190 and 200. Disk adapters 120 control data transfers between cache memory 130 and storage devices 150. Cache memory 130 is a memory for temporarily storing data received from host computer 180 or data read from storage device 150. Shared memory 140 is a memory shared by all the host adapters 110 and disk adapters 120 in storage system 100.

The volume information 400 manages the logical volume and holds a volume state, a format, a capacity, a pair number, and a physical address. FIG. 4 shows an example of volume information 400. Volume information 400 is retained in a memory referable from host adapter 110 and disk adapter 120, for example, in shared memory 140, for management purposes. Any of "normal", "original", "secondary", "abnormal", and "blank" is held as a volume state. The logical volume 230 with a "normal" or an "original" volume state represents the logical volume which is normally accessible from host computer 180. Access from host computer 180 may also be permitted to the logical volume with a "secondary" volume state. Logical volume 230 with an "original" volume state represents the logical volume for which replication of data is conducted. Logical volume 230 with a "secondary" volume state represents the logical volume that is used for replication. Logical volume 230 with an "abnormal" volume state represents the logical volume which is normally inaccessible due to failure. The failure is, for example, a breakdown of storage device 150 holding logical volume 230. Logical volume 230 with a "blank" volume state represents the logical volume that has not been used. The pair number is effective when the volume state is "original" or "secondary" and holds a pair number for specifying pair information 500. In the example shown in FIG. 4, logical volume 1 shows that the format is OPENS, the capacity is 3 GB, and the data has been stored from the head of the storage area of storage device 150 of the storage device number 1, can be accessed and is the data replication object.

Pair information 500 is the information for managing the pair and contains a pair state, an original storage system number, an original logical volume number, a secondary storage system number, a secondary logical volume number, a group number, and a copy complete address. FIG. 5 shows an example of pair information 500. Pair information 500 is retained in a memory referable from host adapter 110 and disk adapter 120, for example, a shared memory 140. Any of "normal", "abnormal", "blank", "not copying", and "copying" is retained as a pair state. The "normal" pair state shows that data replication of original logical volume 230 has been carried out normally. The "abnormal" pair state shows that replication of original logical volume 230 was not carried out due to a failure. The failure was, for example, disconnection of connection path 200. The "blank" pair state shows that the information of the pair number was not effective. The "copying" pair state shows that the initial copy process was undertaken. The "not copying" pair state shows that the initial copy process has not yet been conducted. The original storage system number contains the number specifying original storage system 100A holding original logical volume 230. The secondary storage system number contains the number specifying secondary storage system 100B holding secondary logical volume 230. In the case of the original storage system, a group number is retained to which the original logical volume belongs, and in the case of the secondary storage system, the group number is retained to which the secondary logical volume belongs. The copy complete address is explained in the description of the initial copy process below. Pair information 1 in FIG. 5 shows that the data replication object is original logical volume 1 of original storage system 1; the data replication destination is secondary logical volume 1 of secondary storage system 2; and the data replication process was conducted normally.

Figure 8:
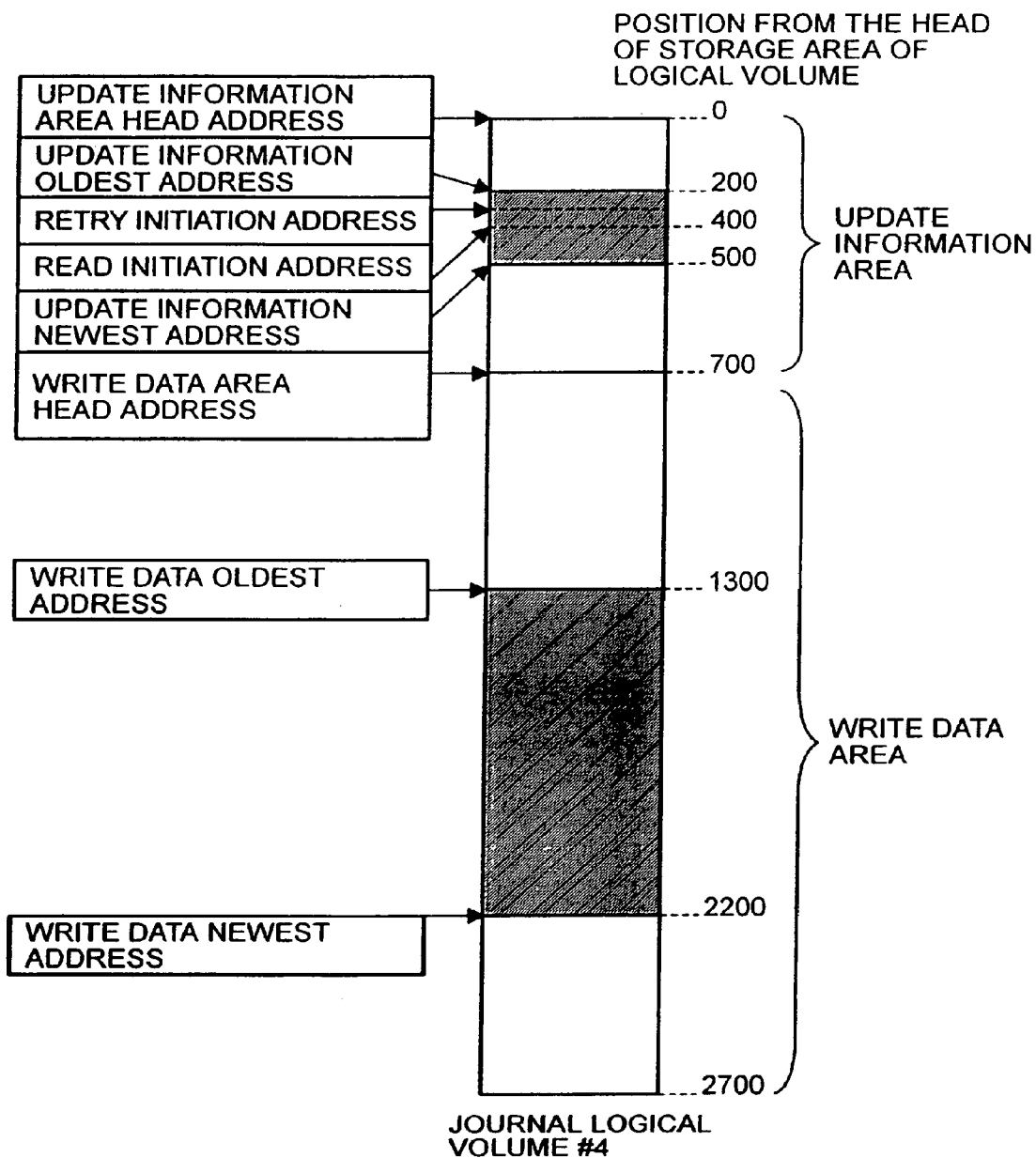
FIG. 8 illustrates a structure of the journal logical volume of the first embodiment of the present invention.

Group information 600 contains a group state, a pair set, a journal logical volume number, and an update number. FIG. 6 shows an example of group information 600. Group information 600 is retained in a memory referable from host adapter 110 and disk adapter 120, for example, a shared memory 140. Any of "normal", "abnormal", and "blank" is held as a group state. The "normal" group state shows that at least one pair state of a pair set is "normal". The "abnormal" group state shows that all the pair states of a pair set are "abnormal". The "blank" group state shows that the information of the aforesaid group number is not effective. In the case of the original storage system, the pair set holds the pair numbers of all the original logical volumes which belong to the group indicated by the group number. In the case of a secondary storage system, the pair numbers of all the secondary logical volumes belonging to the group indicated by the group number are held. The journal logical volume number shows the journal logical volume number belonging to the group with the aforesaid group number. For the update number, the initial value is 1, and 1 is added if data writing is performed with respect to the original logical volume in the group. The update number is stored in the journal update information and used for protecting the data update order in the secondary storage system 100B. For example, the group information 1 in FIG. 6 is composed of pair information 1, 2, original logical volumes 1, 2, and journal logical volume 4 and shows that data replication is being performed normally Pointer information 700 is held for each group, to manage the journal logical volume of the group, and contains an update information area head address, a write data area head address, an update information newest address, an update information oldest address, a write data newest address, a write data oldest address, a read initiation address, and a retry initiation address. FIG. 7 and FIG. 8 show examples of pointer information 701. The update information area head address holds the logical address of the head of the information area storing the update information of the journal logical volume. The write data area head address holds the logical address of the head of the information area storing the write data of the journal logical volume. The update information newest address holds the logical address of the head address of the area in which the next update information will be stored. The update information oldest address holds the logical address of the head retaining the update information of the oldest journal (the update number is small). The write data newest address holds the logical address of the head used for holding the write data when a journal is stored next. The write data oldest address holds the logical address of the head retaining the write data of the oldest journal (the update number is small). The read initiation address and retry initiation address are used only in the original storage system 100A for the journal read reception process. In the example of pointer information 701 in FIG. 7 and FIG. 8, the area retaining the journal management information is from the head of the information area of logical volume 4 to position 699, and the area retaining the write data of the journal is from position 700 to position 2699 in the information area of logical volume 4. The management information of the journal is retained from position of 200 to position of 499 in the information area of logical volume 4, and the management information of the next journal is retained from position 500 in the information area of logical volume 4. The write data of the journal is retained from position 1300 to position 2199 in the information area of logical volume 4, and the write data of the next journal is retained from position 2200 in the information area of logical volume 4.

The explanation below is provided with respect to a mode in which one journal logical volume is allocated to one group, but a plurality of journal logical volumes may also be allocated to one group. For example, two journal logical volumes are allocated to one group; the pointer information 701 is provided for each journal logical volume, and the journals are stored alternately. As a result, writing into storage device 150 of the journal can be dispersed and performance is expected to be improved. In addition, read performance of the journals is also improved. In another example, two journal logical volumes are allocated to one group and usually only one journal logical volume is used. The other journal logical volume is used when the performance of the journal logical volume that has been used is degraded. Performance degradation occurs, for example, when a journal logical volume is composed of a plurality of storage devices 150, data is held in a RAID5 system, and one of the storage devices 150 has failed.

The above-described volume information 400, pair information 500, group information 600, and pointer information 701 are preferably stored in shared memory 140. However, the present embodiment is not limited to this case, and the information of those types may be also stored in a centralized or decentralized form in the cache memory 130, host adapter 110, disk adapter 120, and other storage devices 150.

The procedure for initiating data replication from the original storage system 100A to the secondary storage system 100B is described below with reference to FIG. 9 and FIG. 10.

(1) Explanation of group creation (step 900). A user refers to group information 600 of original storage system 100A by using the maintenance terminal or host computer 180 and acquires the group number A for which the group state is "blank". The user specifies the group number A by using the maintenance terminal or host computer 180 and conducts the group creation specification in original storage system 100A.

Having received the group creation specification, original storage system 100A changes the group state with the specified group number A to "normal".

Similarly, the user refers to group information 600 of secondary storage system 100B and acquires the group number B for which the group state is "blank". The user specifies secondary storage system 100B and the group number B and conducts the group creation specification in original storage system 100A using the maintenance terminal or host computer 180. Original storage system 100A transfers the received group creation specification to secondary storage system 100B. Secondary storage system 100B changes the group state with the specified group number B to "normal".

The user may also specify the group number B and conduct the group creation specification in secondary storage system 100B by using the maintenance terminal of secondary storage system 100B or host computer 180 connected to secondary storage system 100B.

(2) Explanation of pair recording (step 910). The user specifies the information indicating the data replication object and the information indicating the data replication address and conducts the pair record specification in original storage system 100A by using the maintenance terminal or host computer 180. The information indicating the data replication object is the original logical value number and the group number A of the data replication object. The information indicating the data replication address is the secondary storage system 100B retaining the replicated data, the group number B, and the secondary logical volume number.

Having received the above-mentioned pair recording specification, original storage system 100A acquires the pair number for which the pair information is "blank" from pair information 500 and sets the pair state to "not copying", the original storage system number indicating original storage system 100A to the original storage system number, the specified original logical volume number to the original logical volume number, the specified secondary storage system number to the secondary storage system number, the specified secondary logical volume number to the secondary logical volume number, and the specified group number A to the group number. Original storage system 100A adds the acquired pair number to the pair set of group information 600 of the specified group number A and changes the volume state of the original logical volume number to "original".

Original storage system 100A specifies the original storage system number indicating original storage system 100A, group number B specified by the user, the original logical volume number and the secondary logical volume number to secondary storage system 100B. Secondary storage system 100B acquires the blank pair number from pair information 500 and sets the pair state to "not copying", the original storage system number indicating original storage system 100A to the original storage system number, the specified original logical volume number to the original logical volume number, the secondary storage system number indicating the secondary storage system B to the secondary storage system number, the specified secondary logical volume number to the secondary logical volume number, and the specified group number B to the group number.

Secondary storage system 100B adds the acquired pair number to the pair set of group information 600 of the specified group number B and changes the volume state of the secondary logical volume number to "secondary".

The above-described operation is performed for the pairs of all the data replication objects.

The explanation above was provided with respect to the process in which the recording of logical volumes into a group and setting of logical volume pairs was performed simultaneously, but the volume pairs may be individually recorded.

Figure 9:
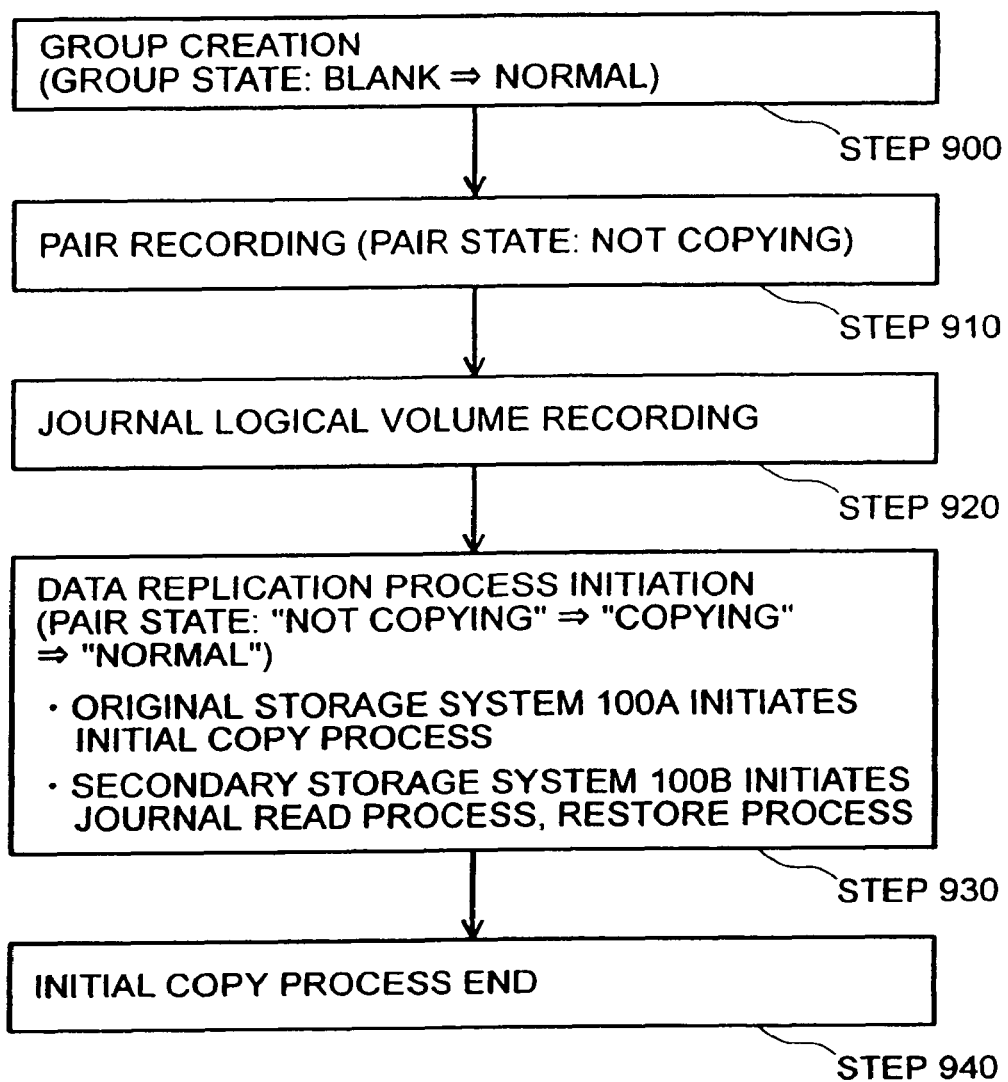
FIG. 9 is a flow chart illustrating a procedure for initiating data replication of the first embodiment of the present invention.

(3) Explanation of journal logical volume recording (step 920) is provided with reference to FIG. 9. The user provides the specification (journal logical volume recording specification) for recording the logical volume used for journal retention in original storage system 100A using the maintenance terminal or host computer 180. The journal logical volume recording specification is composed of a group number and a logical volume number.

Original storage system 100A records the specified logical volume number in the journal logical volume number of group information 600 with the specified group number. The volume state of volume information 400 of this logical volume is set to "normal".

Similarly, the user refers to volume information 400 of secondary storage system 100B, specifies the logical volume numbers used as secondary storage system 100B, group number B, and the journal logical volume, and performs the journal logical volume recording in original storage system 100A by using the maintenance terminal or host computer 180. Original storage system 100A transfers the journal logical volume recording specification to secondary storage system 100B. Secondary storage system 100B records the specified logical volume number in the journal logical volume number of group information 600 of the specified group number B. The volume state of volume information 400 of the aforesaid logical volume is set to "normal".

The user may also specify the logical volume number used as the journal logical volume and the group number and provide the journal logical volume recording specification in secondary storage system 100B using the maintenance terminal of secondary storage system 100B or the host computer 180 connected to secondary storage system 100B.

The above-described operations are carried out with respect to all the logical volumes used as the journal logical volumes. The order of steps 910 and 920 can change.

(4) Explanation of data replication process initiation (step 930) follows. The user specifies the group number for initiating the data replication process and specifies the initiation of the data replication process to original storage system 100A by using the maintenance terminal or host computer 180. Original storage system 100A sets to 0 all the copy complete addresses of pair information 400 belonging to the specified group.

Original storage system 100A specifies the initiation of the journal read process and the restore process to the secondary storage system 100B.

Original storage system 100A initiates the initial copying process.

(5) Explanation of initial copying process end (step 940).

If the initial copying process ends, original storage system 100A posts the end of the initial copying process to secondary storage system 100B. Secondary storage system 100B changes the pair states of all the secondary logical volumes belonging to the specified group to "normal".

Figure 10:
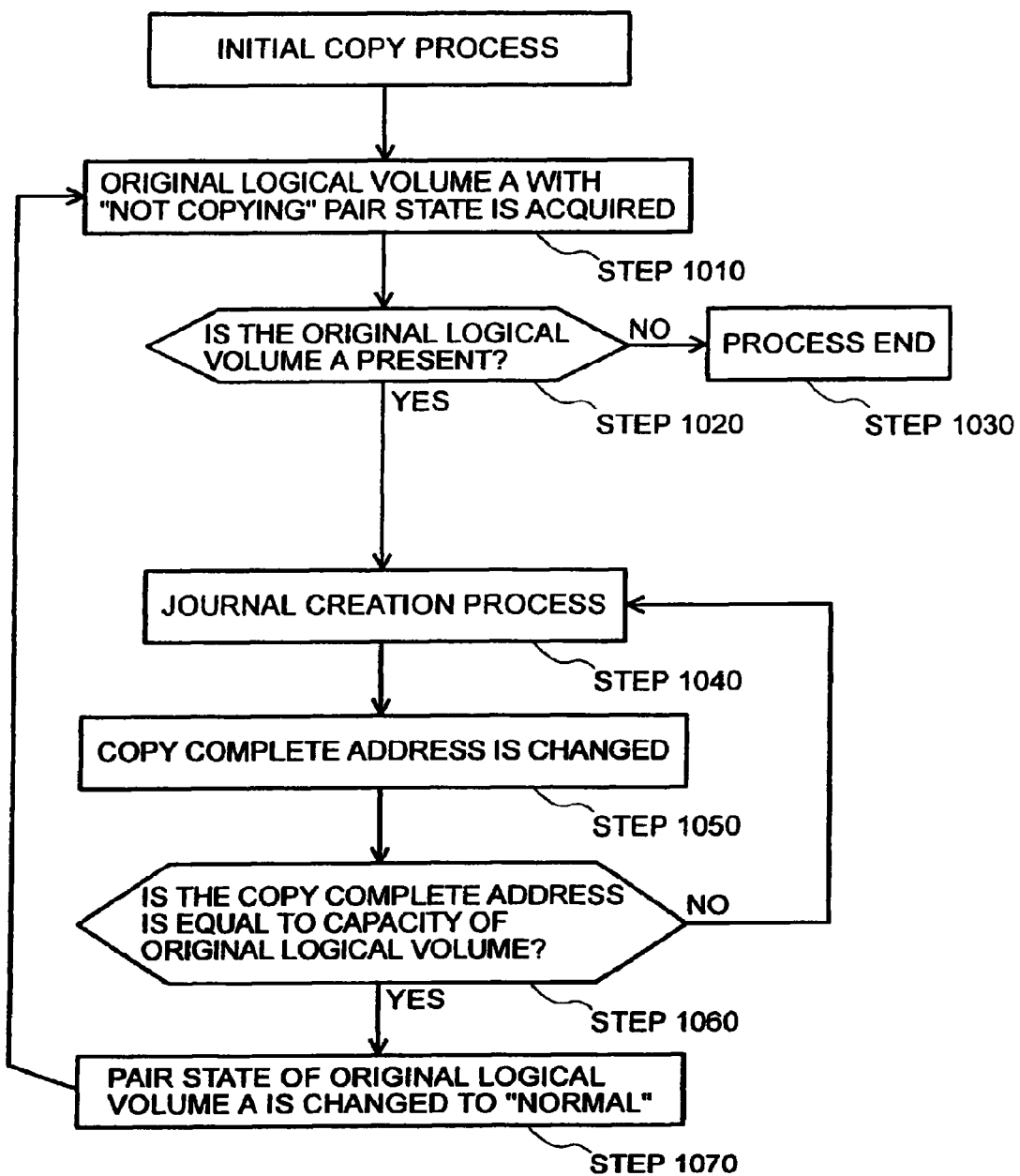
FIG. 10 is a flow chart illustrating an initial copying process of the first embodiment of the present invention.

FIG. 10 is a flowchart of the initial copying process. In the initial copying process, the copy complete address of pair information 500 is used with respect to the entire storage area of the original logical volume of the data replication object and a journal is created for each unit size in the order starting from the head of the storage area. The initial value of the copy complete address is 0, and the created data quantity is added up for each journal creation. A journal creation is completed in the initial copying process from the head of the storage area of the logical volume to the address which is one prior to the copy complete address. Conducting the initial copying process makes it possible to transfer the data of the original logical volume that has not been updated into the secondary logical volume. In the explanation below, processing conducted by one of host adapters 110 in original storage system 100A is described, but processing may also be conducted by one of disk adapters 120.

(1) Host adapter 110 of original storage system 100A obtains original logical volume 230-1 for which the pair state is "not copying" in the pair belonging to the group that is the object of processing, changes the pair state to "copying", and repeats the process (steps 1010, 1020). When no original logical volume 230-1 is present, the process ends (step 1030).

(2) In step 1020, when logical volume 230-1 is present, the host adapter 110 creates a journal with the unit size (for example, 1 MB) data. The journal creation process is described below (step 1040).

(3) The host adapter 110 adds the data size of the created journal to the copy complete address (step 1050).

(4) The above-described processing is repeated until the copy complete address reaches the capacity of original logical volume 230-1 (step 1060). When the copy complete address becomes equal to the capacity of original logical volume 230-1, the journal is created with respect to the entire storage area of original logical volume 230-1. Thus, the pair state is updated to "normal" and processing of the other original logical volumes is initiated (step 1070).

In the above-described flow chart, the explanation was conducted with respect to processing logical volumes one by one. However, a plurality of logical volumes may be processed simultaneously.

Figure 11:
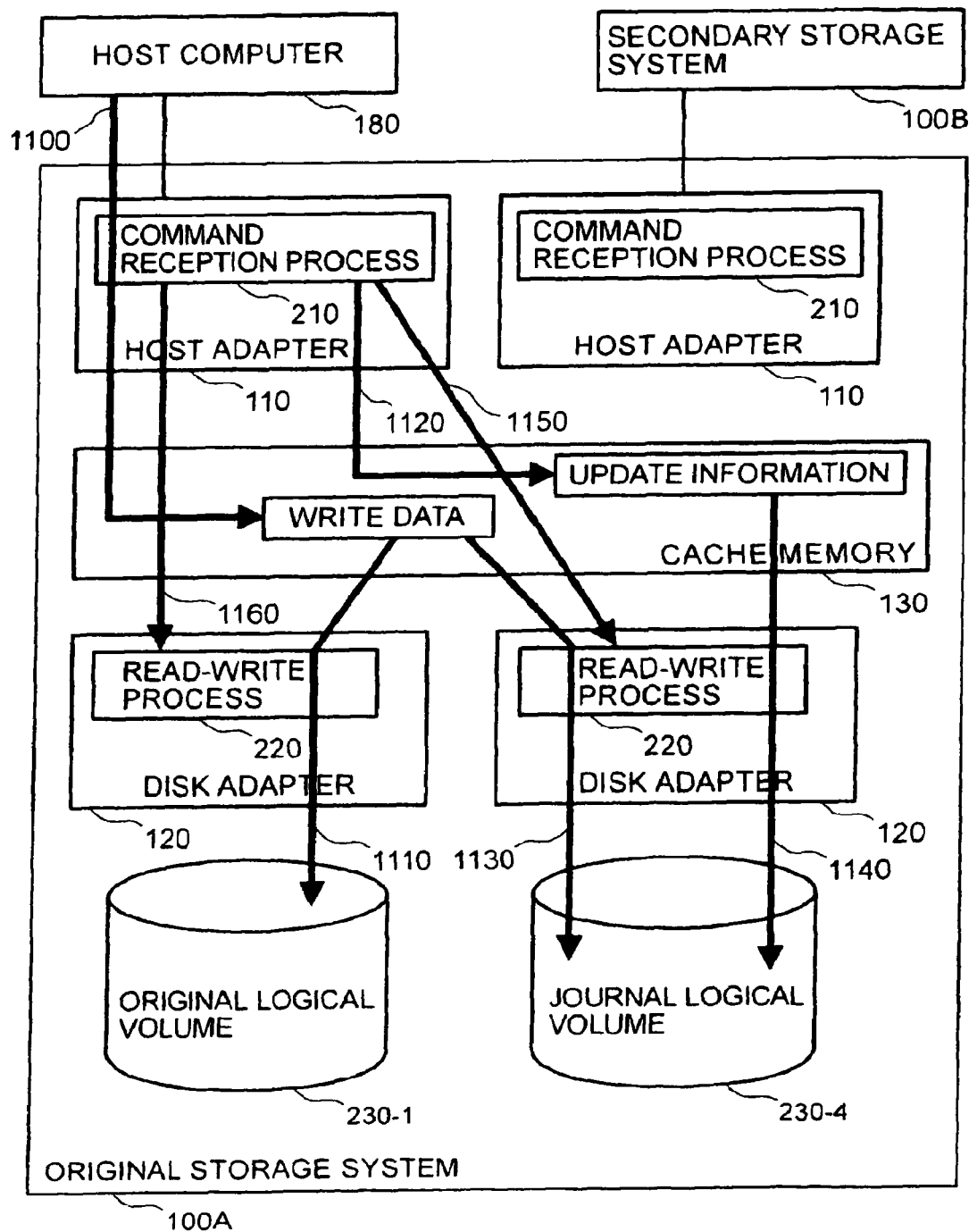
FIG. 11 illustrates a command reception process of the first embodiment of the present invention.
Figure 12:
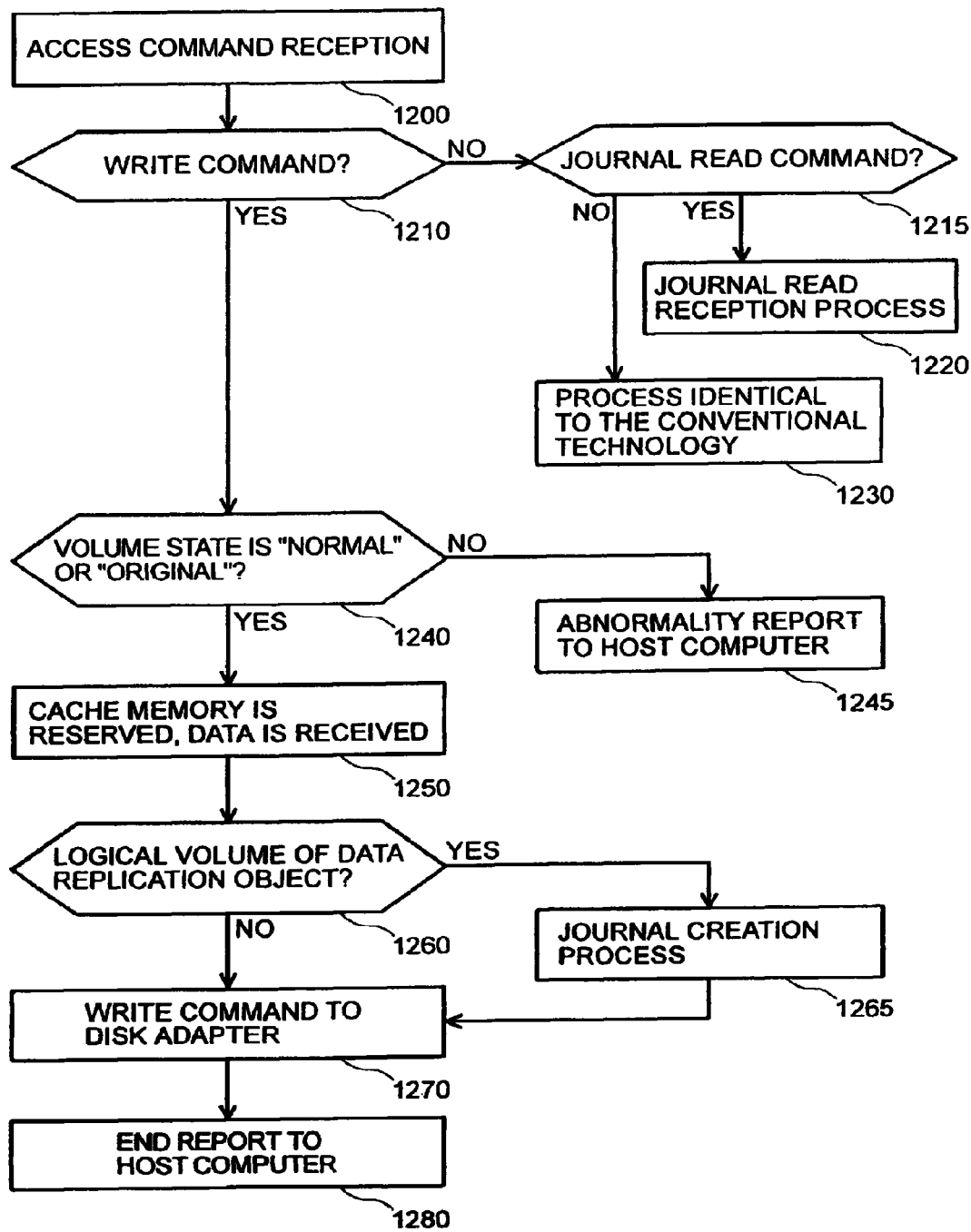
FIG. 12 is a flow chart of the command reception process of the first embodiment of the present invention.
Figure 13:
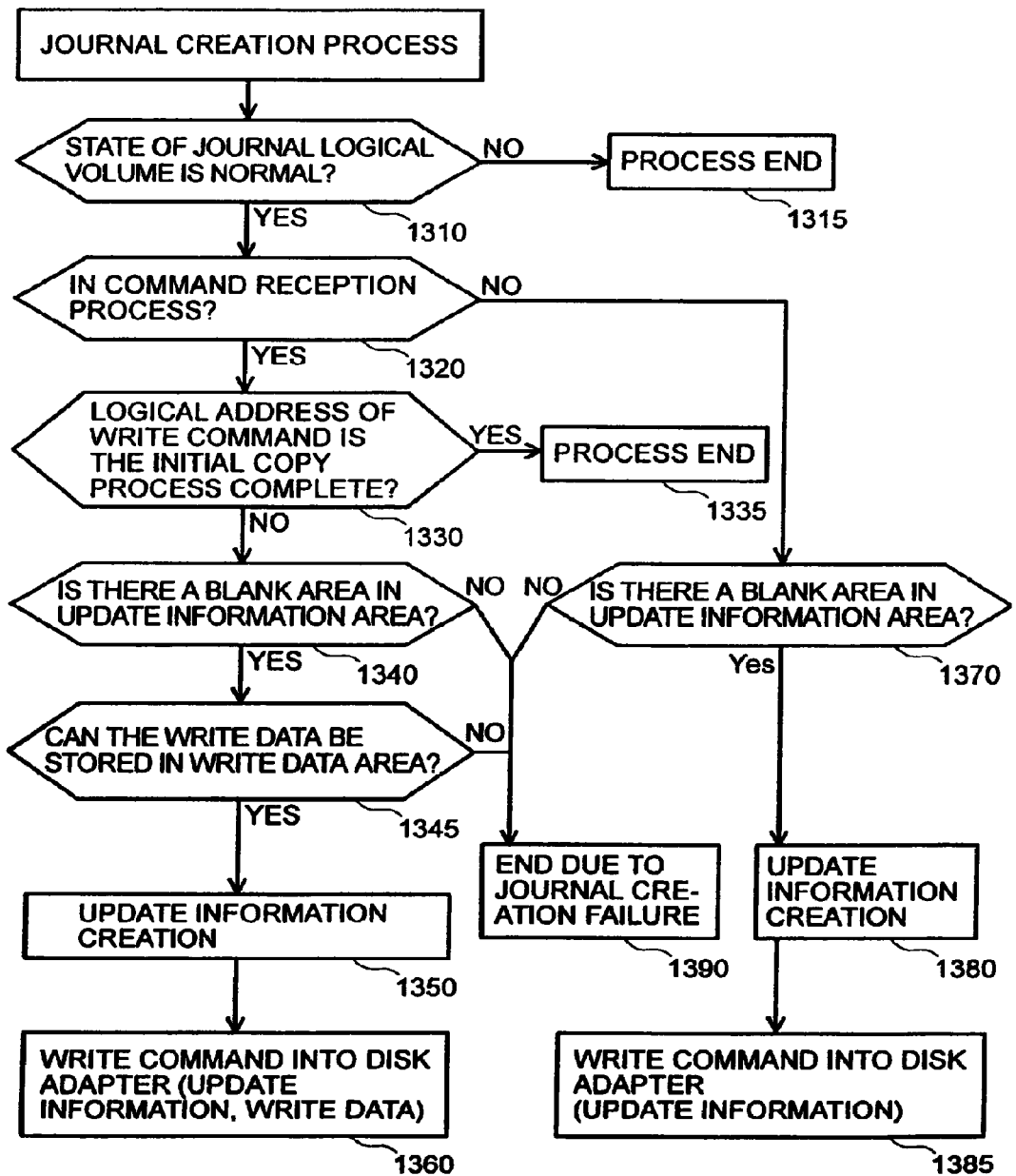
FIG. 13 is a flow chart of a journal creation process of the first embodiment of the present invention.

FIG. 11 illustrates the command reception process 210; FIG. 12 is a flow chart of the command reception process 210, and FIG. 13 is a flow chart of the journal creation process. The operation relating to a case in which original storage system 100A receives a write command for logical volume 230 of the data replication object from host computer 180 is explained below with reference to these figures.

(1) The host adapter 110 in original storage system 100A receives an access command from the host computer. The access command includes commands such as read, write, and journal read, the logical address which is the object of the command, the quantity of data, and the like. In this example, the logical address in the access command is denoted by the logical address "A"; the logical volume number is denoted by logical volume number of volume 230-1; the location in the logical volume is denoted by a location "A" in the logical volume 230-1; and the quantity of data is denoted by data quantity "A" of the volume 230-1 (step 1200 of FIG. 12).

(2) Host adapter 110 examines the access command (steps 1210, 1215 of FIG. 12). When the access command is a journal read command in step 1215 of FIG. 12, the journal read reception process is implemented (step 1220 of FIG. 12). When the access command is other than the journal read command and write command, for example, when the access command is a read command, a read process is implemented in accordance with conventional technology (step 1230 of FIG. 12).

(3) When the access command is a write command in step 1210 of FIG. 12, volume information 400 of logical volume 230-1 is referred to and the volume state is examined (step 1240 of FIG. 12). When the volume state of logical volume 230-1 is other than "normal" or "original" in step 1240, access to logical volume 230-1 is impossible. As a result, an abnormal end is reported to host computer 180 (step 1245 in FIG. 12).

(4) When the volume state of logical volume 230-1 is either "normal" or "original" in step 1240, host adapter 110 reserves cache memory 130 and notifies host computer 180 that the preparation for data reception has been made. Host computer 180 receives this notification and transmits the write data to original storage system 100A. Host adapter 110 receives the write data and retains it in cache memory 130 (steps 1250, 1100 in FIG. 11).

(5) Host adapter 110 refers to the volume state of logical volume 230-1 and determines whether logical volume 230-1 is the data replication object (step 1260 of FIG. 12). When the volume state is "original" in step 1260, logical volume 230-1 is the data replication object. Accordingly, the journal creation process is conducted (step 1265 of FIG. 12).

(6) When the volume state is "normal" in step 1240, or after completing the journal creation process of step 1265, host adapter 110 instructs disk adapter 120 to write the write data into storage device 150 (1140 in FIG. 11) and reports the process end to host computer 180 (steps 1270, 1280 of FIG. 12). Thus disk adapter 120 retains the write data in storage device 150 by read-write process (1110 in FIG. 11).

The journal creation process is explained below.

(1) Host adapter 110 examines the volume state of the journal logical volume 230-4 (step 1310 in FIG. 13). When the volume state of the journal logical volume 230-4 is "abnormal" in step 1310, storing a journal in the journal logical volume 230-4 is impossible. Accordingly, the group state is changed to "abnormal" and the process ends (step 1315 in FIG. 13). In this case, the journal logical volume 230-4 is changed to the normal logical volume.

(2) When the journal logical volume 230-4 is determined to be "normal" in step 1310, the journal creation process continues. The journal creation process differs depending on whether it is conducted within the initial copying process or within the command reception process (step 1320 in FIG. 13). When the journal creation process is executed within the command reception process, the process is conducted from step 1330 in FIG. 13. When the journal creation process is executed within the initial copying process, the process is conducted from step 1370 in FIG. 13.

(3) When the journal creation process is conducted within the command reception process, host adapter 110 determines whether the logical address "A" of the write object has become the processing object of the initial copying process (step 1330). When the pair state of logical volume 230-1 is "not copying", the journal creation process is executed thereafter in the initial copying process. As a result, the process ends without creating a journal (step 1335 in FIG. 13). When the pair state of logical volume 230-1 is "copying," if the copy complete address is equal to or less than position "A" in the logical address, the journal creation process is carried out thereafter in the initial copying process. Accordingly, the process ends without creating a journal (step 1335). In other cases, that is, when the pair state of logical volume 230-1 is "copying" and the copy complete address is no less than position "A" in the logical address, or when the pair state of logical volume 230-1 is "normal," the initial copying process has already been completed. Therefore, the journal creation process continues.

(4) Host adapter 110 then determines whether the journal can be stored in the journal logical volume. The presence or absence of a blank area in the update information area is ascertained using pointer information 701 (step 1340 in FIG. 13). When the update information newest address and the update information oldest address of pointer information 701 are equal to each other, no blank area exists in the update information area. For this reason, the process ends as a journal creation failure (step 1390 in FIG. 13).

When a blank area is present in the update information area in step 1340, pointer information 701 is used to determine whether the write data can be stored in the write data area (step 1345 in FIG. 13). When the sum of the write data newest address and a quantity "A" of the data is equal to or larger than the write data oldest address, storage is not possible in the write data area. For this reason, the process ends as a journal creation failure (step 1390).

(5) When the journal can be stored, host adapter 110 acquires the logical address storing the update number and update information and the logical address storing the write data, and creates the update information in cache memory 130. The update number, a numeric value acquired from group information 600 of the object group and having 1 added thereto, is set to the update number of group information 600. The logical address storing the update information is the update information newest address of pointer information 701, and the numeric value having the size of the update information added thereto is set to the update information newest address of pointer information 701. The logical address storing the write data is the write data newest address of pointer information 701, and the numeric value obtained by adding the quantity "A" of the data to the write data newest address is set to the write data newest address of pointer information 701.

Host adapter 110 sets the above-described numeric values, group number, the time at which the write command was received, the logical address "A" in the write command, and quantity "A" of the data, to the update information (step 1350 in FIG. 13; 1120 in FIG. 11). For example, when a write command of data with a size of 100 has been received in position 800 from the head of the storage area of the original logical volume 1 230-1 of group 1 in a state of group information 600 shown in FIG. 6 and pointer information 701 shown in FIG. 7, the update information shown in FIG. 22 is created. The update number of the group information becomes 5, the update information newest address of the pointer information becomes 600 (the size of the update information is 100), and the write data newest address becomes 2300.

(6) Host adapter 110 instructs disk adapter 120 to write the update information and the write data into storage device 150 and normally ends processing (step 1360 in FIG. 13; 1130, 1140, 1150 in FIG. 11).

(7) When the journal creation process is within the initial copying process, the process of step 1370 in FIG. 13 is conducted. Host adapter 110 determines whether the journal can be created. The presence or absence of a blank area of update information is examined using pointer information 701 (step 1370). When the update information newest address and the update information oldest address of pointer information 701 are equal to each other, no blank area is present in the update information area. For this reason, the process ends as a journal creation failure (step 1390). In the case of the initial copying process shown in the present embodiment, the write data of the journal is read from the original logical volume, and because the write data area is not used, confirms the blank area of the write data area is not necessary.

(8) When creation of the journal is ascertained as possible at step 1370, host adapter 110 acquires the numeric value that will be set in the update information and creates the update information in cache memory 130. The update number, a numeric value acquired from the group information 600 of the object group and having 1 added thereto is set to the update number of the group information 600. The logical address storing the update information is the position of the update information newest address of pointer information 701, and the numeric value having the size of the update information added thereto is set to the update information newest address of pointer information 701.

Host adapter 110 sets the above-described acquired numeric values, the group number, the initiation time for this process, the logical address of the initial copying process object, a processing quantity of one initial copy, and the logical address of the initial copying process object to the logical address of the journal logical volume storing the write data (step 1380 in FIG. 13; 1120 in FIG. 11).

(9) Host adapter 110 instructs disk adapter 120 to write the update information into storage device 150 and normally ends the process (step 1385 in FIG. 13; 1140, 1160 in FIG. 11).

In the explanation above, a case was described in which the update information was present in cache memory 130, but the update information also may be stored in shared memory 140.

Writing the write data into storage device 150 may be conducted asynchronously, that is, not directly after steps 1360 and 1385. However, if host computer 180 again issues a write command to logical address "A", the write data of the journal is overwritten. Therefore, the write data of the journal has to be written into a storage device 150 corresponding to the logical address of the journal logical volume of update information before write data from host computer 180 is received. Alternatively, writing into a storage device 150 corresponding to the logical address of the journal logical volume of update information may be conducted after the write data is moved in another cache memory.

In the above-described journal creation process, the journal was assumed to be retained in storage device 150, but it is also possible to prepare a constant-capacity cache memory 130 for the journal in advance and to retain the journal in storage device 150 after this cache memory has been entirely used. The cache memory capacity for the journal is specified, for example, from the maintenance terminal.

Read-write process 220 is implemented by disk adapter 120 upon reception of a command from host adapter 110 or disk adapter 120. The process to be implemented includes a process of writing the data of the specified cache memory 130 into a storage area in storage device 150 corresponding to the specified logical address and a process of writing the data into the specified cache memory 130 from the storage area in storage device 150 corresponding to the specified logical address.

Figure 14:
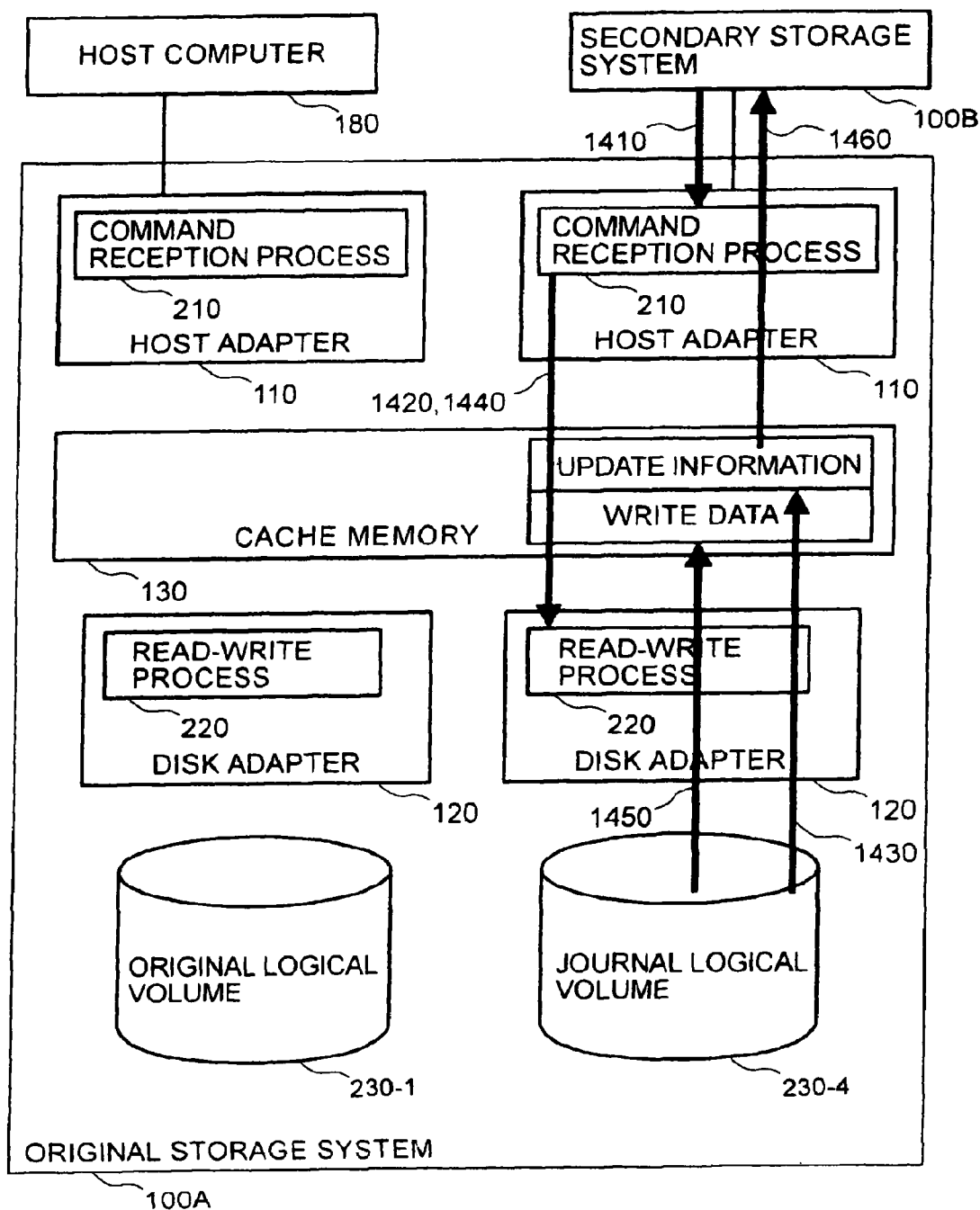
FIG. 14 illustrates a journal read reception process of the first embodiment of the present invention.
Figure 15:
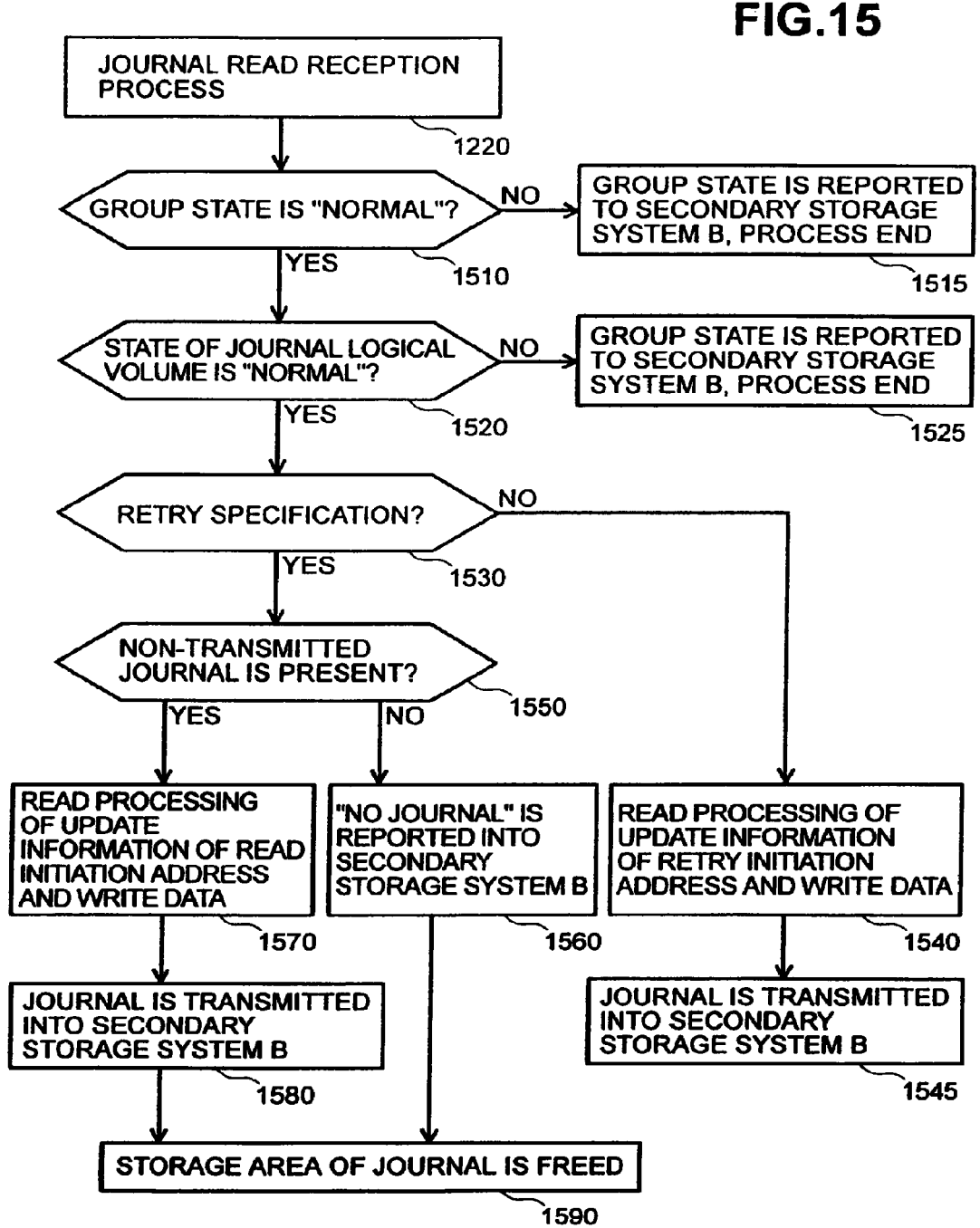
FIG. 15 is a flow chart of the journal read reception process of the first embodiment of the present invention.

FIG. 14 explains the operation (journal read reception process) of host adapter 110 of original storage system 100A that has received a journal read command. FIG. 15 is a flow chart of this operation. An operation relating to a case in which original storage system 100A has received a journal read command from secondary storage system 100B is explained below with reference to these figures.

(1) Host adapter 110 in original storage system 100A receives an access command from secondary storage system 100B. The access command comprises an identifier indicating that this is a journal read command, a group number of the command object, and the presence or absence of retry specification. The group number in the access command is denoted below as group number "A" (step 1220 in FIG. 15; 1410 in FIG. 14).

(2) Host adapter 110 determines whether the group state with group number "A" is "normal" (step 1510). When the group state is found to be other than "normal", for example, a "failure" in the examination conducted in step 1510, the group state is posted to secondary storage system 100B and the process ends. Secondary storage system 100B conducts the process according to the received group state. For example, when the group state is "failure," the journal read process ends (step 1515).

(3) When the group state of group number "A" is "normal" at step 1510, host adapter 110 examines the volume state of the journal logical volume 230-4 (step 1520). When the volume state of the journal logical volume is found to be, for example, "failure", rather than "normal", in the examination conducted at step 1520, the group state is changed to "failure;" the group state is posted to secondary storage system 100B, and the process ends. Secondary storage system 100B conducts processing according to the received group state. For example, when the group state is "failure," the journal read process ends (step 1525), (4) When the volume state of the journal logical volume is "normal" at step 1520, a determination is made whether the journal read command is a retry specification (step 1530).

(5) When the journal read command is found to be a retry at step 1530, host adapter 110 again transmits the previously transmitted journal to secondary storage system 100B. Host adapter 110 reserves cache memory 130 and instructs the disk adapter to read the information on the size of the update information from the retry initiation address of pointer information 701 to the cache memory (1420 in FIG. 14).

In the read-write process of the disk adapter, the update information is read from storage device 150 and retained in cache memory 130, and host adapter 110 is notified to this effect (1430 in FIG. 14).

Host adapter 110 receives the notification of the read end of update information, acquires the logical address of write data and the size of the write data from the update information, reserves cache memory 130, and instructs the disk adapter to read the write data in the cache memory (step 1540 in FIG. 15; 1440 in FIG. 14).

In the read-write process of the disk adapter, the write data is read from storage device 150 and retained in cache memory 130, and host adapter 110 is notified to this effect (1450 in FIG. 14).

Host adapter 110 receives notification of the read end of write data, transmits the update information and write data to secondary storage system 100B, frees cache memory 130 holding the journal, and ends the process (step 1545 in FIG. 15; 1460 in FIG. 14).

(6) When the journal read command is found not to be a retry specification in the examination conducted at step 1530, host adapter 110 examines the presence of a journal that has not been transmitted. If such a journal is present, it is transmitted to secondary storage system 100B. Host adapter 110 compares the read initiation address of pointer information 701 with the update information newest address (step 1550).

When the read initiation address is equal to the update information newest address, the transmission of the entire journal to secondary storage system 100B is complete. Therefore, "no journal" is transmitted to secondary storage system 100B (step 1560) and the storage area of the journal that was transmitted to the secondary storage system 100B during the previous journal read command is freed (step 1590).

The process for freeing the journal storage area sets the retry initiation address to the update information oldest address of pointer information 701. When the update information oldest address becomes the write data area head address, the update information oldest address is set at "0." The write data oldest address of pointer information 701 changes to a numeric value obtained by adding the size of the write data transmitted according to the previous read journal command. When the write data oldest address becomes the logical address above the capacity of the journal logical volume 230-4, the write data area head address is decreased and corrected.

(7) When the presence of a non-transmitted journal is found in the examination conducted in step 1550, host adapter 110 reserves cache memory 130 and instructs the disk adapter to read the information on the size of update information from the read initiation address of pointer information 701 to the cache memory (1420 in FIG. 14).

In the read-write process of disk adapter 110, the update information is read from storage device 150 and retained in cache memory 130, and the host adapter is notified to this effect (1430 in FIG. 14).

The host adapter 110 receives the notification of the read end of update information, acquires the logical address of the write data and the size of the write data from the update information, reserves the cache memory 130, and instructs the disk adapter 110 to read the write data in the cache memory (step 1570; 1440 in FIG. 14).

In the read-write process of disk adapter 110, the write data is read from the storage device 150 and retained in the cache memory 130, and the host adapter is notified to this effect (1450 in FIG. 14).

Host adapter 110 receives notification of the read end of the write data, transmits the update information and the write data to the secondary storage system 100B (step 1580) and frees cache memory 130 holding the journal (1460 in FIG. 14). Then, it sets the read initiation address to the retry initiation address of pointer information 701 and sets a numerical value obtained by adding the update information size of the transmitted journal to the read initiation address.

(8) Host adapter 110 frees the storage area of the journal that was transmitted to secondary storage system 100B during the previous journal read command (step 1590).

In the above-described journal read reception process, original storage system 100A transmitted journals one by one to secondary storage system 100B. However, a plurality of journals may simultaneously be transmitted to 1 secondary storage system 100B. The number of journals transmitted in response to one journal read command may be specified in the journal read command by secondary storage system 100B and may be specified in original storage system 100A or secondary storage system 100B by the user, e.g., during the group creation. Furthermore, the number of journals transmitted in response to one journal read command may be changed dynamically according to the transfer capacity, load, and the like, of connection path 200 of original storage system 100A and secondary storage system 100B. Further, the journal transfer quantity may also be specified by considering the size of the write data of journals, rather than the number of journals.

In the above-described journal read reception process, the journals were written into cache memory 130 from storage device 150, but if the journals are present in cache memory 130, this process is unnecessary.

The above-described process for freeing the storage area of the journal in the journal read reception process was conducted during subsequent journal read command processing, but the freeing of storage area may be also conducted immediately after the journal has been transmitted to secondary storage system 100B. Further, secondary storage system 100B may set the update number whose storage area can be freed in the journal read command, and original storage system 100A may free the journal storage area according to this specification.

Figure 16:
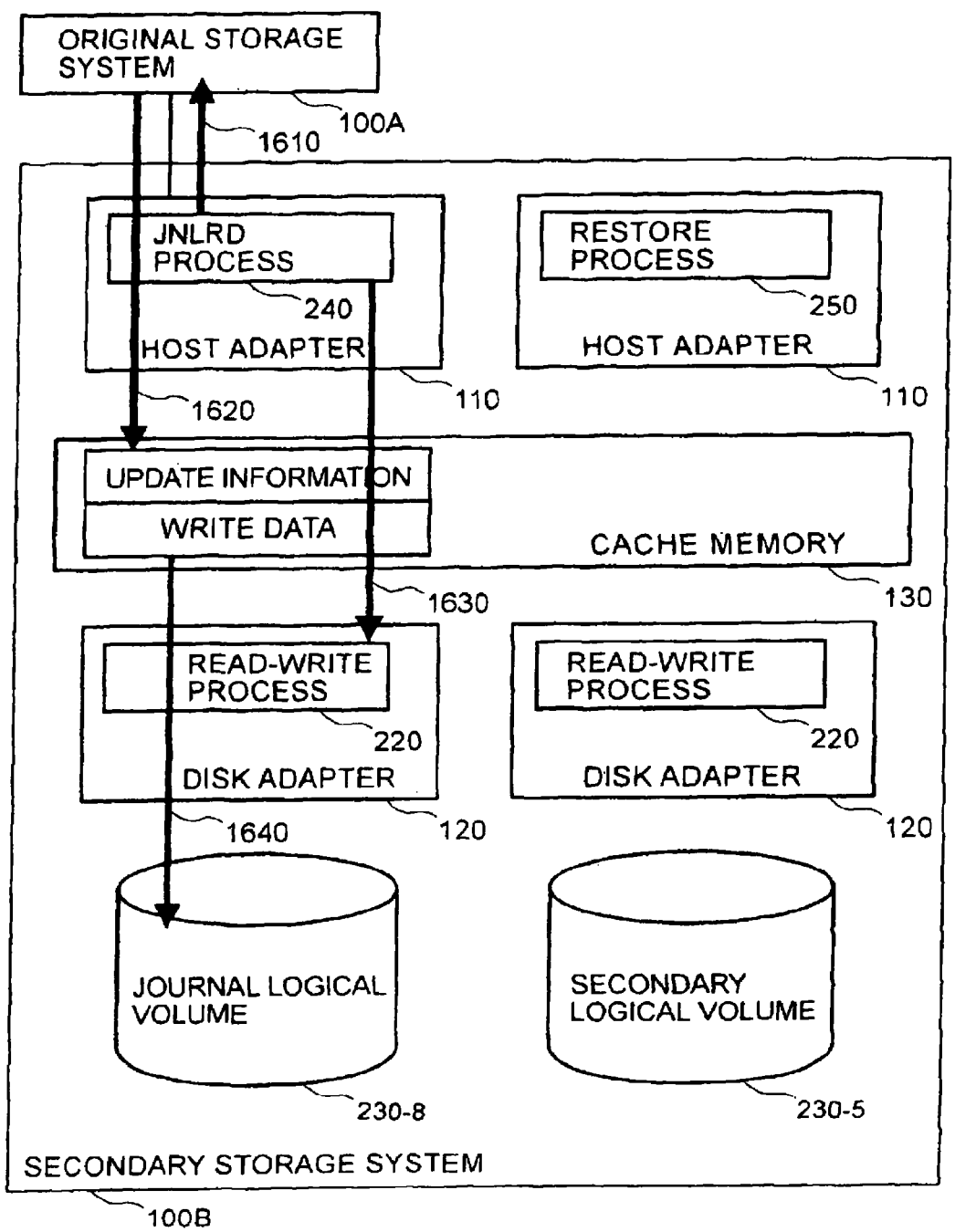
FIG. 16 illustrates a journal read command process of the first embodiment of the present invention.
Figure 17:
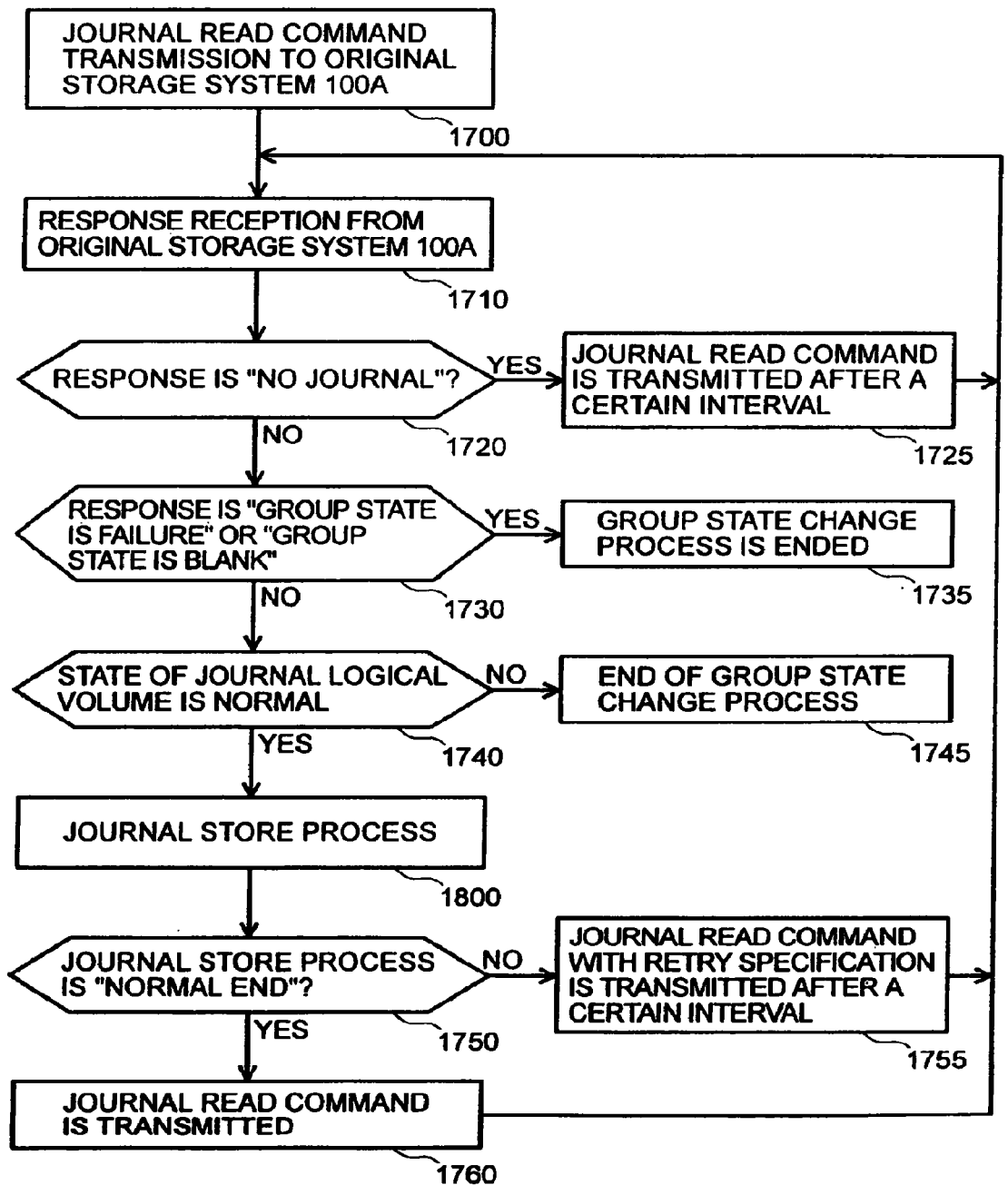
FIG. 17 is a flow chart of the journal read command process of the first embodiment of the present invention.
Figure 18:
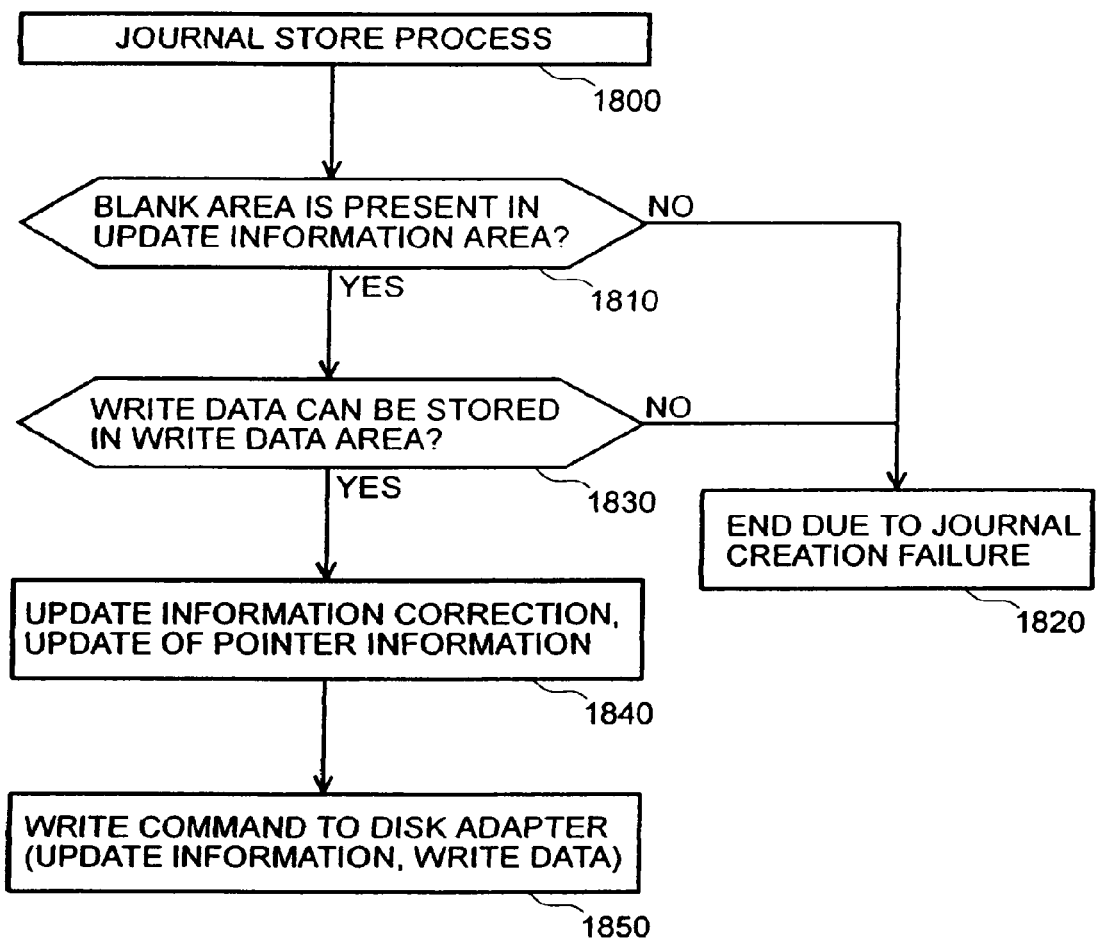
FIG. 18 is a flow chart of a journal store process of the first embodiment of the present invention.

FIG. 16 explains journal read command process 240. FIG. 17 is a flow chart of this process. FIG. 18 is a flow chart of a journal store process. The operation in which host adapter 110 of secondary storage system 100B reads the journals from original storage system 100A and stores them in a journal logical volume 230-8 is described below with reference to these figures.

(1) Host adapter 110 in secondary storage system 100B reserves cache memory 130 storing the journal and transmits to original storage system 100A an access command comprising an identifier indicating that this is a journal read command, a group number of the command object in original storage system 100A, and the presence or absence of a retry specification. The group number in the access command is denoted below as a group number "A" (step 1700; 1610 in FIG. 16).

(2) Host adapter 110 receives the journal and the response of original storage system 100A (1620 in FIG. 16). Host adapter 110 examines the response and, when the response from original storage system 100A is "no journal," transmits a read journal command to original storage system 100A after a certain interval, because the journal of the specified group is not present in original storage system 100A (steps 1720, 1725).

(4) When the response of original storage system 100A is "group state is failure" or "group state is blank," the group state of secondary storage system 100B is changed to the received state, and the journal read process ends (steps 1730, 1735).

(5) When the response of original storage system 100A is normal, that is, other than the above-described responses, the volume state of journal logical volume 230-8 is examined (step 1740). When the volume state of journal logical volume 230-8 is "abnormal", the journal cannot be stored in the journal logical volume 230-8. Therefore, the group state is changed to "abnormal" and the process ends (step 1745). In this case, the group state is returned to normal by changing the journal logical volume 230-8 to the normal logical volume.

(6) When the volume state of the journal logical volume 230-8 is normal in the examination conducted at step 1740, journal store process 1800 is conducted. When the journal store process 1800 ends normally, the next journal read command is transmitted. Alternatively the next journal read command is transmitted after a certain interval (step 1760 in FIG. 17). As for the timing for transmitting the next journal command, transmission may be conducted periodically at constant intervals or the timing may be determined by the number of journals, the traffic on connection line 200, the storage capacity of the journal held by secondary storage system 100B, the load on secondary storage system 100B, and the like. Furthermore, the information capacity of the journal held by original storage system 100A or the pointer information of original storage system 100A may be read from secondary storage system 100B and the timing may be determined by the numeric value thereof. Transfer of this information may be conducted by a special command and may be included in the response of the journal read command.

In considering the timing for transmitting the next journal command and changing a term for transmitting the next journal command, if the information capacity of the journal held by the original storage system 100A or the information capacity of the journal held by the secondary storage system 100B has greater quantity, the data processing system can change the information capacity of the journal for the storage system 100A or 100B. The subsequent process is identical to that following step 1710.

(7) When the journal storage process of step 1800 does not end normally, the blank area of the journal logical volume 230-8 is not presented. For this reason, the received journal is canceled and a journal read command with a retry specification is transmitted after a certain interval (step 1755 in FIG. 17). Alternatively, the journal is held in the cache memory and the journal store process is conducted again after a certain interval. This is because conducting restore process 250 (described below) makes it possible to add the blank area to the journal logical volume after a certain interval. With such a method, the presence of a retry specification in the journal read command is unnecessary.

Journal store process 1800 illustrated in FIG. 18 is explained below.

(1) Host adapter 110 determines whether the journal can be stored in the journal logical volume 230-8. The presence of a blank area in the update information area is examined using pointer information 701 (step 1810). When the update information newest address and the update information oldest address of pointer information 701 are equal to each other, no blank area is present in the update information area. For this reason, the process ends as a journal creation failure (step 1820).

(2) When a blank area is present in the update information area in step 1810, an examination is conducted about whether the write data can be stored in the write data area by use of pointer information 701 (step 1830). When the sum of the write data newest address and the quantity of write data of the received journal is equal to or larger than the write data oldest address, the write data cannot be stored in the write data area. For this reason, the process ends as a journal creation failure (step 1820).

(3) When the journal can be stored, host adapter 110 changes the group number and the logical address of the journal logical volume 230-8 in the received update information. The group number is changed to the group number "B" of secondary storage system 100B, and the logical address of the journal logical volume is changed to the write data newest address of pointer information 701. Host adapter 110 changes the update information newest address of pointer information 701 to a numeric value obtained by adding the size of update information to the update information newest address. Host adapter 110 changes the write data newest address of pointer information 701 to a numeric value obtained by adding the size of write data to the write data newest address (step 1840).

(4) Host adapter 110 instructs disk adapter 120 to write the update information and the write data in storage device 150 and ends the process as a journal creation success (step 1850 in FIG. 18; 1630. in FIG. 16). Disk adapter 120 then writes the update information and the write data into storage device 150 by the read-write process and frees cache memory 130 (1640 in FIG. 16).

In the above-described journal store process, the journal was assumed to be retained in storage device 150, but it is also possible to prepare a constant-capacity cache memory 130 for the journal in advance and to retain the journal in storage device 150 after the entire cache memory has been used. The cache memory capacity for the journal is specified, for example, from the maintenance terminal.

Figure 19:
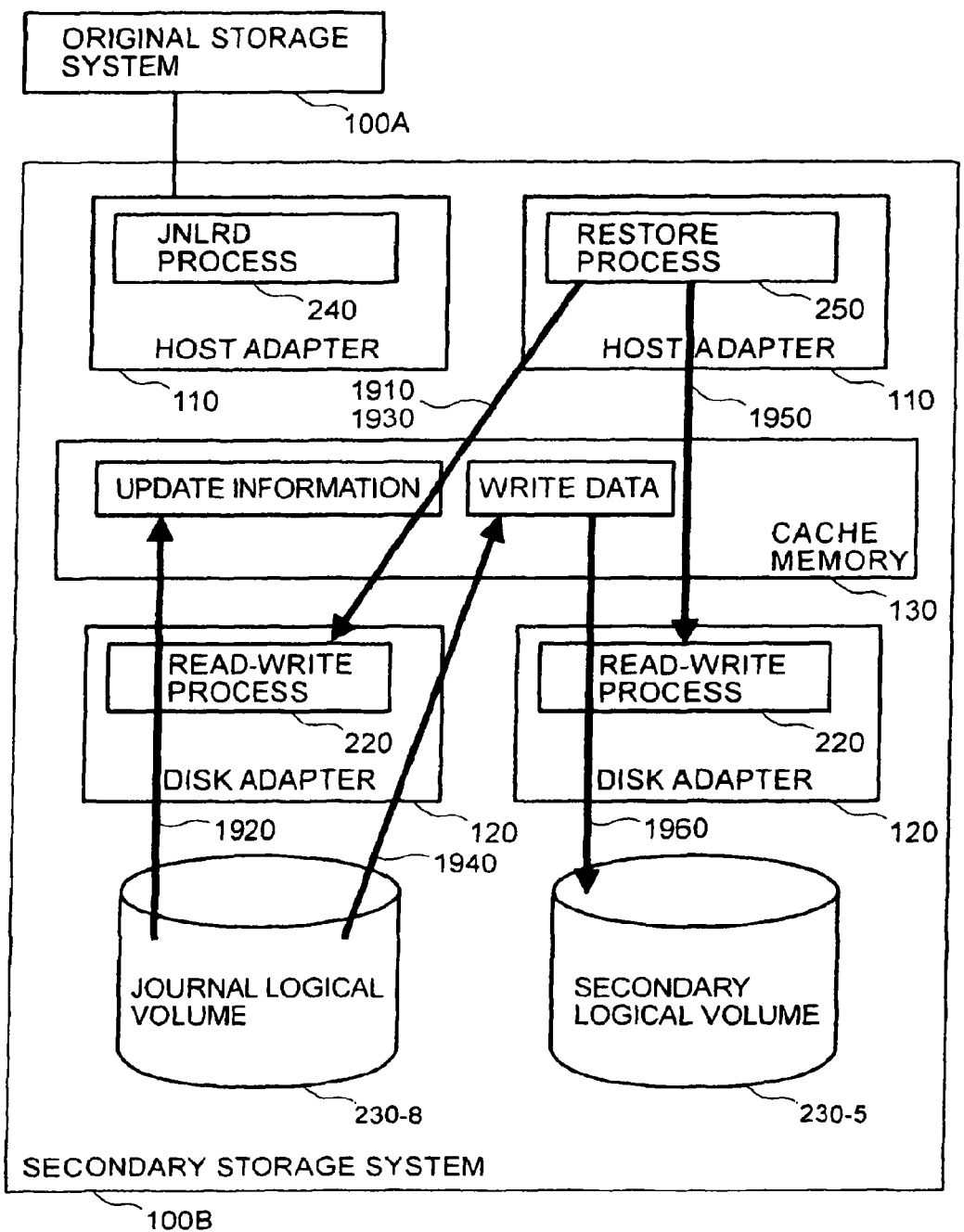
FIG. 19 illustrates a restore process of the first embodiment of the present invention.
Figure 20:
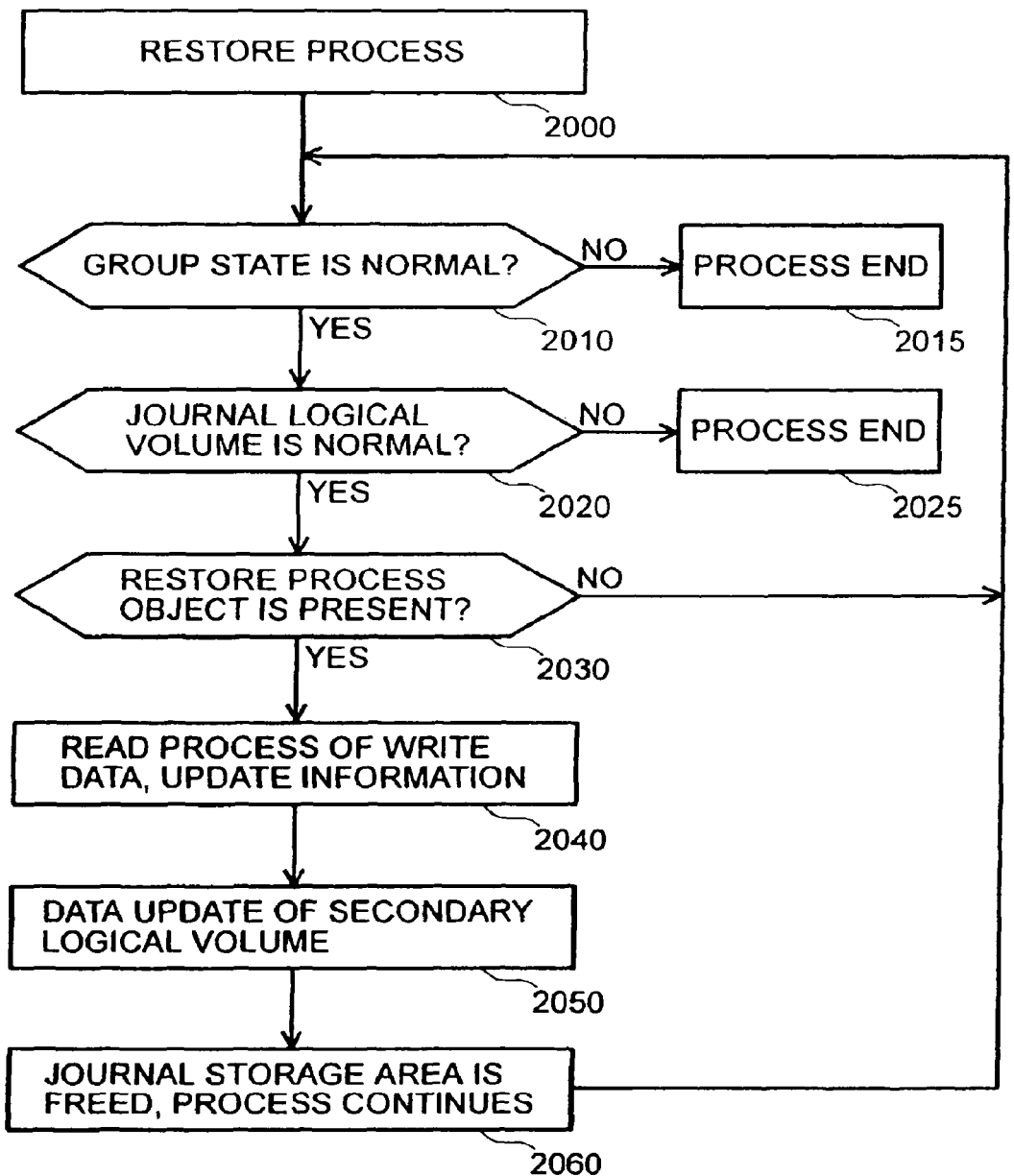
FIG. 20 is a flow chart of the restore process of the first embodiment of the present invention.

FIG. 19 explains restore process 250. FIG. 20 is a flow chart of this process. The operation in which host adapter 110 of secondary storage system 100B uses the journal and conducts data update is described below with reference to these figures. Restore process 250 may be also conducted by disk adapter 120 of secondary storage system 100B.

(1) Host adapter 100 determines whether the group state of group number "B" is "normal" (step 2010). When the group state is found to be other than "normal", for example, "failure," at step 2010, the restore process ends (step 2015).

(2) When the group state is found to be "normal" at step 2010, the volume state of the journal logical volume 230-8 is examined (step 2020). When the volume state of journal logical volume 230-8 is found to be "abnormal" at step 2020, access is impossible. As a result, the group state is changed to "abnormal" and the process ends (step 2025).

(3) When the volume state of journal logical volume 230-8 is found to be "normal" at step 2020, examination is made to of whether the journal of restore object is present. Host adapter 110 acquires the update information oldest address and the update information newest address of pointer information 701. When the update information oldest address and the update information newest address are equal to each other, no journal is present. Accordingly, the restore process is temporarily stopped and resumed after a certain interval (step 2030).

(4) When the journal of restore object is present at step 2030, the following process is conducted with respect to the journal having the oldest (minimum) update number. The update information of that journal is retained from the update information oldest address of pointer information 701. Host adapter 110 reserves cache memory 130 and instructs the disk adapter to read the information on the size of the update information in cache memory 130 (1910 in FIG. 19).

In the read-write process of the disk adapter, the update information is read from storage device 150 and retained in cache memory 130, and host adapter 110 is notified to this effect (1920 in FIG. 19).

Host adapter 110 receives the notification of the read end of the update information, acquires the logical address of the write data and the size of the write data from the update information, reserves cache memory 130, and instructs the disk adapter to read the write data in cache memory (1930 in FIG. 19).

In the read-write process of the disk adapter, the write data is read from storage device 150 and retained in cache memory 130, and the host adapter is notified to this effect (step 2040 of FIG. 20; 1940 in FIG. 19).

(5) Host adapter 110 finds the logical address of the secondary logical volume that will be obtained from the update information and instructs the disk adapter to write the write data into the secondary logical volume 230-5 (step 2050 in FIG. 20; 1950 in FIG. 19). In the read-write process of the disk adapter, the data is written into storage device 150 corresponding to the logical address of the secondary logical volume 230-5; cache memory 130 is freed, and the host adapter is notified to this effect (1960 in FIG. 19).

(6) Host adapter 110 receives the notification of the write process end of the disk adapter and frees the journal storage area. The process for freeing the journal storage area changes the update information oldest address of the pointer information 701 to a numeric value obtained by adding the size of update information. When the update information oldest address becomes the write data area head address, the update information oldest address is set "0". The write data oldest address of pointer information 701 changes to a numeric value obtained by adding the size of the write data. When the write data oldest address becomes the logical address above the capacity of the journal logical volume, the write data area head address is decreased and corrected. Host adapter 110 thereafter initiates the next restore process (step 2060 in FIG. 20).

In the above-described restore process 250, the journal was read from storage device 150 into cache memory 130, but when it is present in cache memory 130, this process is unnecessary.

In the above-described journal read reception process and journal read command process 240, a journal to be transmitted by original storage system 100A was determined by pointer information 701, but secondary storage system 100B may also determine a journal to be transmitted. For example, an update number is added to the journal read command. In this case, a retrieval method or a table for finding the logical address where the update information has been stored from the update number is provided in shared memory 140 of original storage system 100A in order to find the logical address of update information with the update number specified by secondary storage system 100B in the journal read reception process.

In the above-described journal read reception process and journal read command process 240, a journal read command was used, but the usual read command may be also used. For example, the group information 600 and pointer information 701 of original storage system 100A are transferred in advance into secondary storage system 100B, and secondary storage system 100B reads the data (that is, the journal) of the journal logical volume 230-4 of original storage system 100A.

In the above-described journal read reception process, the explanation was conducted with respect to the case in which the journals were transmitted from original storage system 100A to secondary storage system 100B in the order of update numbers. However, they may be also transmitted not in the order of update numbers. Furthermore, a plurality of journal read commands may be transmitted from original storage system 100A to secondary storage system 100B. In this case, a retrieval method or a table for finding the logical address where the update information has been stored from the update number is provided in secondary storage system 100B in order to process the journals in the order of update numbers in the restore process.

In the above-described data processing system in accordance with the present invention, the original storage system acquires the journals and the secondary storage system replicates the data. As a result, the host computer connected to the original storage system carries no load relating to data replication. Furthermore, communication lines of the original storage system and the host computer connected to the original storage system are not used because the journals are transferred between the original storage system and the secondary storage system.

Figure 23:
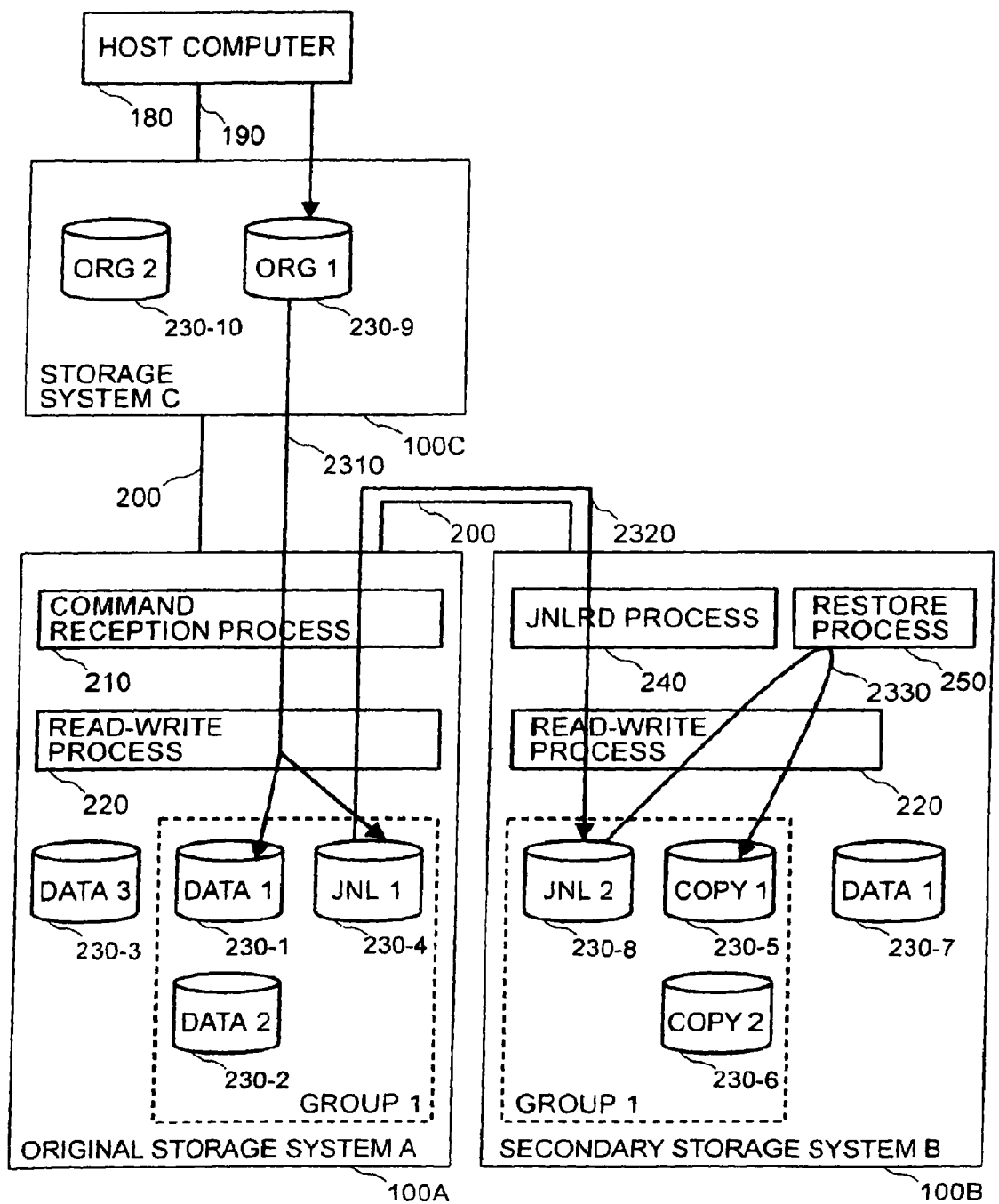

FIG. 23 shows a logical configuration of the second embodiment.

In this configuration, host computer 180 and storage system 100C are connected by connection path 190; storage system 100C and original storage system 100A are connected by connection path 200, and original storage system 100A and secondary storage system 100B are connected by connection path 200. Storage system 100C includes logical volumes 230-9 (ORG1) and 230-10 (ORG2), and conducts the data update of logical volume 230-9 (ORG1) and the data update of logical volume 230-1 (DATA1) in original storage system 100A during the data update into the logical volume 230-9 (ORG1) of storage system 100C.

Original storage system 100A, as was described in the first embodiment, conducts the retention of journals in journal logical volume 230-4 (JNL1) using command reception process 210 and read-write process 220 during the data update into the original logical volume 230-1 (DATA1) (2310 in FIG. 23).

Secondary storage system 100B reads the journal from original storage system 100A using journal read process 240 described above, and retains the journal in the journal logical volume 230-8 (JNL2) using read-write process 220 (2320 in FIG. 23).

If original storage system 100A receives a command to read a journal from secondary storage system 100B, it reads the journal from the journal logical volume 230-4 (JNL1) using command reception process 210 and read-write process 220 and transmits the journal to secondary storage system 100B (2320).

Secondary storage system 100B reads the journal from the journal logical volume 230-8 (JNL2) according to the update number using restore process 250 and read-write process 220 (both described above) and updates the data of the secondary logical volume 230-5 (COPY1), which is the duplicate of the original logical volume 230-1 (DATA1) (2330). Consistency of data between the logical volumes can thus be maintained by updating the data in the order of update numbers.

In the above-described data processing system in accordance with the present invention, the original storage system acquires a journal and stores it in a storage area specially designed for journals. Furthermore, the secondary storage system stores the journal received from the original storage system in a storage area specially designed for journals. The storage area specially designed for journals can be smaller than the storage area of the data replication object, and replication of data of the original storage system into the secondary storage system can be conducted with a smaller storage capacity.

Figure 24:
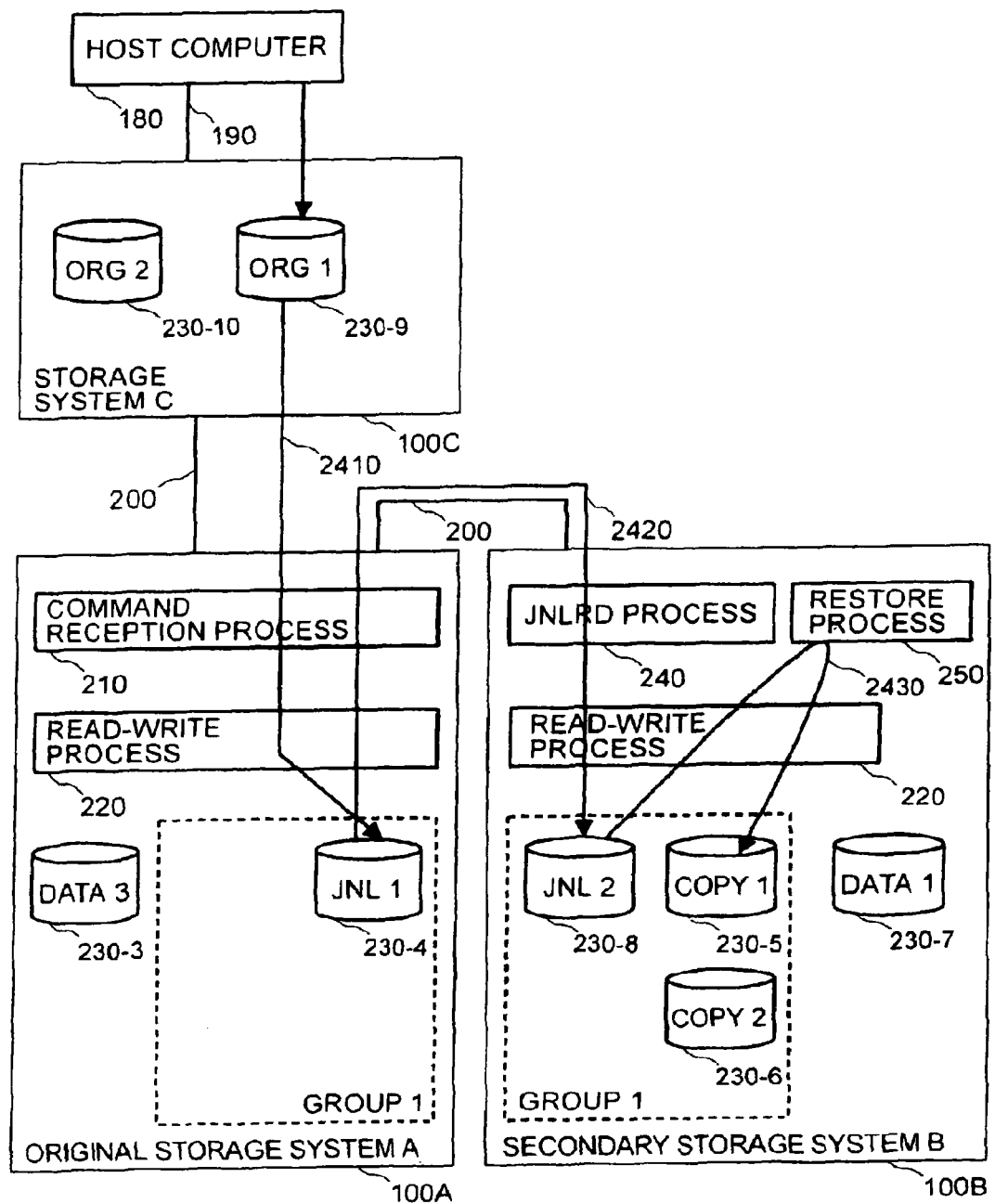
FIG. 24 illustrates the third embodiment of the present invention.

FIG. 24 shows a logical configuration of the third embodiment.

In this configuration, host computer 180 and storage system 100C are connected by connection path 190; storage system 100C and original storage system 100A are connected by connection path 200, and original storage system 100A and secondary storage system 100B are connected by connection path 200. Storage system 100C conducts data update of a logical volume 230-9 (ORG1) and data update of a logical volume (DATA1) in original storage system 100A during the data update into the logical volume (ORG1) of storage system 100C, as described with reference to the conventional technology.

Although original storage system 100A is indicated as having the original logical volume (DATA1) to storage system 100C, original storage system does not allocate actual storage areas, that is, storage devices 150. That is, no physical storage areas corresponding to the volume (DATA1) exists in the storage system 100A. For example, it sets numerical values indicating that storage devices 150 have not been allocated to the physical addresses of volume information 400. During the reception of the write command to the data of the original logical volume (DATA1) from storage system 100C, the original storage system 100A does not conduct process step 1270 of command reception process 210 (described above) and conducts only the retention of journal in the journal logical volume 230-4 (JNL1) (2410 in FIG. 24).

Secondary storage system 100B reads a journal from original storage system 100A using journal read process 240 as described above, and retains the journal in the journal logical volume 230-8 (JNL2) using read-write process 220 (2420 in FIG. 24).

If original storage system 100A receives a command to read a journal from secondary storage system 100B, it reads the journal from the journal logical volume 230-4 (JNL1) using command reception process 210 and read-write process 220 and transmits the journal to secondary storage system 100B (2420).

Secondary storage system 100B reads the journal from the journal logical volume 230-8 (JNL2) according to the update number using restore process 250 described above and read write process 220 and updates the data of the secondary logical volume 230-5 (COPY1), which is the duplicate of the logical volume (ORG1) (2430). The consistency of data between the logical volumes can thus be maintained by updating the data in the order of update numbers.

In the above-described data processing system in accordance with the present invention, when a failure occurs in storage system 100C or host computer 180 connected to storage system 100C, a journal (JNL1) present in original storage system 100A is reflected in the logical volume 230-5 (COPY1) of secondary storage system 100B, thereby making it possible to refer to and to update the newest data with the host computer connected to secondary storage system 100B. Furthermore, a storage capacity necessary for data replication can be decreased by storing only the journals, without holding data replication in original storage system 100A.

In the above-described data processing system in accordance with the present invention, secondary storage system 100B reads (pulls) the journal from original storage system 100A. But, the present invention also works well when original storage system 100A transfers the journal to secondary storage system 100B at a timing given for the next journal command, as described above.

While the invention created by the inventors has been described in terms of the preferred embodiments, those embodiments have been disclosed for illustrative purposes and those skilled in the art will appreciate that the invention is not limited to the above-described embodiments and various modifications, additions and substitutions are possible without departing from the scope and spirit of the invention as disclosed in the accompanying claims. In accordance with the present invention, a storage system can be provided that is capable of performing data transmission or data replication among a plurality of storage systems without affecting host computers in the storage systems. Further, a storage system can be provided that does not affect communication between the storage system and computers.

In accordance with the present invention, the data storage areas held in a plurality of storage systems can be reduced. Furthermore, data transfer or data replication between a plurality of storage systems can be conducted effectively and at a high speed producing no effect on the operation of the host computer of the plurality of storage systems.

What is claimed is:

1. A remote copy system comprising:
   a first storage system coupled to a host computer and having an original volume configured by a plurality of storage devices in the first storage system;
   a second storage system coupled to the first storage system and having a first logical volume and a first journal volume configured by a plurality of storage devices in the second storage system; and
   a third storage system coupled to the second storage system and having a second logical volume configured by a plurality of storage devices in the third storage system, wherein, when the original volume is updated with a write data, the first logical volume is updated with the write data and journal data including the write data and update information corresponding to the write data is written to the first journal volume, wherein, in response to a request for a transmission of the journal data received from the third storage system, the second storage system sends the journal data to the third storage system and the third storage system updates the second logical volume with the write data based on the journal data.

2. A remote copy system according to claim 1,
wherein the first logical volume and the second logical volume configure a copy pair where the first logical volume is managed as a primary volume and the second logical volume is managed as a secondary volume.

3. A remote copy system according to claim 1,
wherein the update information includes the write order of the write data and the write address of the write data.

4. A remote copy system according to claim 1,
wherein the first journal volume temporarily stores the journal data and the journal data is deleted after the write data in the journal data is written to the second logical volume.

5. A remote copy system according to claim 1,
wherein the third storage system has a second journal volume, and
wherein when the third storage system receives the journal data from the second storage system, the third storage system stores the journal data in the second journal volume and uses the journal data in the second journal volume for updating the second logical volume with the write data based on the journal data.

6. A remote copy system according to claim 5,
wherein the third storage system sends the request for a transmission of the journal data to the second storage system repeatedly and decides a timing of the request for a transmission of the journal data according to a storage capacity of the second journal volume.

7. A remote copy method in a system having a first storage system coupled to a host computer and having an original volume configured by a plurality of storage devices in the first storage system; a second storage system coupled to the first storage system and having a first logical volume and a first journal volume configured by a plurality of storage devices in the second storage system; and a third storage system coupled to the second storage system and having a second logical volume configured by a plurality of storage devices in the third storage system, the method comprising the steps of:

when the original volume in the first storage system is updated with a write data, updating the first logical volume in the second storage system with the write data;

writing journal data including the write data and update information corresponding to the write data to the first journal volume in the second storage system;

receiving, by the second storage system, a request for a transmission of the journal data from the third storage system;

sending, by the second storage system, the journal data to the third storage system; and updating, by the third storage system, the second logical volume in the third storage system with the write data based on the journal data.

8. A remote copy method according to claim 7, further comprising the step of:
configuring a copy pair with the first logical volume and the second logical volume, where the first logical volume is managed as a primary volume and the second logical volume is managed as a secondary volume.

9. A remote copy method according to claim 7,
wherein the update information includes the write order of the write data and the write address of the write data.

10. A remote copy method according to claim 7,
wherein the first journal volume temporarily stores the journal data and the journal data is deleted after the write data in the journal data is written to the second logical volume.

11. A remote copy method according to claim 7,
wherein the third storage system has a second journal volume, and
wherein when the third storage system receives the journal data from the second storage system, the third storage system stores the journal data in the second journal volume and uses the journal data in the second journal volume for updating the second logical volume with the write data based on the journal data.

12. A remote copy method according to claim 11,
wherein the third storage system sends the request for a transmission of the journal data to the second storage system repeatedly and decides a timing of the request for a transmission of the journal data according to a storage capacity of the second journal volume.

* * * * *